US011438154B2

(12) United States Patent
Hassan et al.

(10) Patent No.: US 11,438,154 B2
(45) Date of Patent: Sep. 6, 2022

(54) DATA CRYPTOGRAPHIC DEVICES AND MEMORY SYSTEMS

(71) Applicant: Infineon Technologies AG, Neubiberg (DE)

(72) Inventors: Muhammad Hassan, Munich (DE); Bernhard Rohfleisch, Wolfratshausen (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 34 days.

(21) Appl. No.: 16/949,013

(22) Filed: Oct. 9, 2020

(65) Prior Publication Data
US 2021/0119780 A1    Apr. 22, 2021

(30) Foreign Application Priority Data

Oct. 22, 2019   (DE) .......................... 102019128528.3

(51) Int. Cl.
*H04L 9/08* (2006.01)
*H04L 9/06* (2006.01)
(Continued)

(52) U.S. Cl.
CPC .......... *H04L 9/088* (2013.01); *G06F 12/0802* (2013.01); *H04L 9/0618* (2013.01); *G06F 2212/72* (2013.01)

(58) Field of Classification Search
CPC ......... H04L 9/088; H04L 9/0618; H04L 9/14; H04L 9/3242; H04L 9/0637; H04L 2209/72; G06F 12/0802; G06F 12/0888; G06F 12/1408; G06F 2212/72; G06F 21/602; G06F 21/72
See application file for complete search history.

(56) References Cited

U.S. PATENT DOCUMENTS

| 8,036,377 B1 | 10/2011 | Poo et al. |
| 10,164,770 B1 | 12/2018 | Lee |

(Continued)

FOREIGN PATENT DOCUMENTS

| EP | 1187483 A2 | 3/2002 |
| EP | 1300843 A2 | 4/2003 |

(Continued)

OTHER PUBLICATIONS

"Block cipher." Wikipedia, Wikimedia Foundation, Published Jan. 6, 2019 [Retrieved on Jul. 15, 2020].

*Primary Examiner* — Vu V Tran
(74) *Attorney, Agent, or Firm* — Harrity & Harrity, LLP

(57) ABSTRACT

A data cryptographic device may include a pre-tweak generator to generate pre-tweak values, a pre-tweak value cache memory to store one or more pre-tweak values generated by the pre-tweak generator, and a pre-tweak value selector to check whether a pre-tweak value for an input memory address is stored in the pre-tweak value cache memory. The data cryptographic device may further include a tweak generator to generate a tweak value based on the selected pre-tweak value, and a block cipher to perform at least one block cipher algorithm to at least one of encrypt data, encrypt and authenticate data, decrypt encrypted data, decrypt and verify encrypted and authenticated data, using a cryptographic key and the generated tweak value.

20 Claims, 16 Drawing Sheets

(51) Int. Cl.

| | |
|---|---|
| *G06F 12/0888* | (2016.01) |
| *G06F 12/14* | (2006.01) |
| *H04L 9/14* | (2006.01) |
| *H04L 9/32* | (2006.01) |
| *G06F 21/60* | (2013.01) |
| *G06F 12/0802* | (2016.01) |

(56) References Cited

U.S. PATENT DOCUMENTS

| | | |
|---|---|---|
| 2007/0101134 A1 | 5/2007 | Parlan et al. |
| 2011/0311048 A1 | 12/2011 | Nagata et al. |
| 2012/0079285 A1 | 3/2012 | Gueron et al. |
| 2015/0169472 A1 | 6/2015 | Tap et al. |
| 2015/0318984 A1 | 11/2015 | Knop et al. |
| 2016/0056954 A1 | 2/2016 | Lee et al. |
| 2017/0054550 A1* | 2/2017 | Choi ............... H04L 9/0637 |
| 2017/0220494 A1 | 8/2017 | Shacham et al. |
| 2017/0285976 A1* | 10/2017 | Durham ............. G06F 21/64 |
| 2019/0087354 A1 | 3/2019 | Chhabra et al. |
| 2019/0123900 A1 | 4/2019 | Elliott et al. |
| 2019/0156043 A1 | 5/2019 | Chhabra et al. |
| 2020/0380140 A1* | 12/2020 | Medwed ........... G06F 21/6218 |
| 2021/0266143 A1* | 8/2021 | Boue .................. H04L 9/0637 |

FOREIGN PATENT DOCUMENTS

| | | |
|---|---|---|
| JP | 2015511050 A | 4/2015 |
| WO | 2010/054369 A1 | 5/2010 |

\* cited by examiner

Technical Implementation
CABAnA : XEX Block (Encryption)

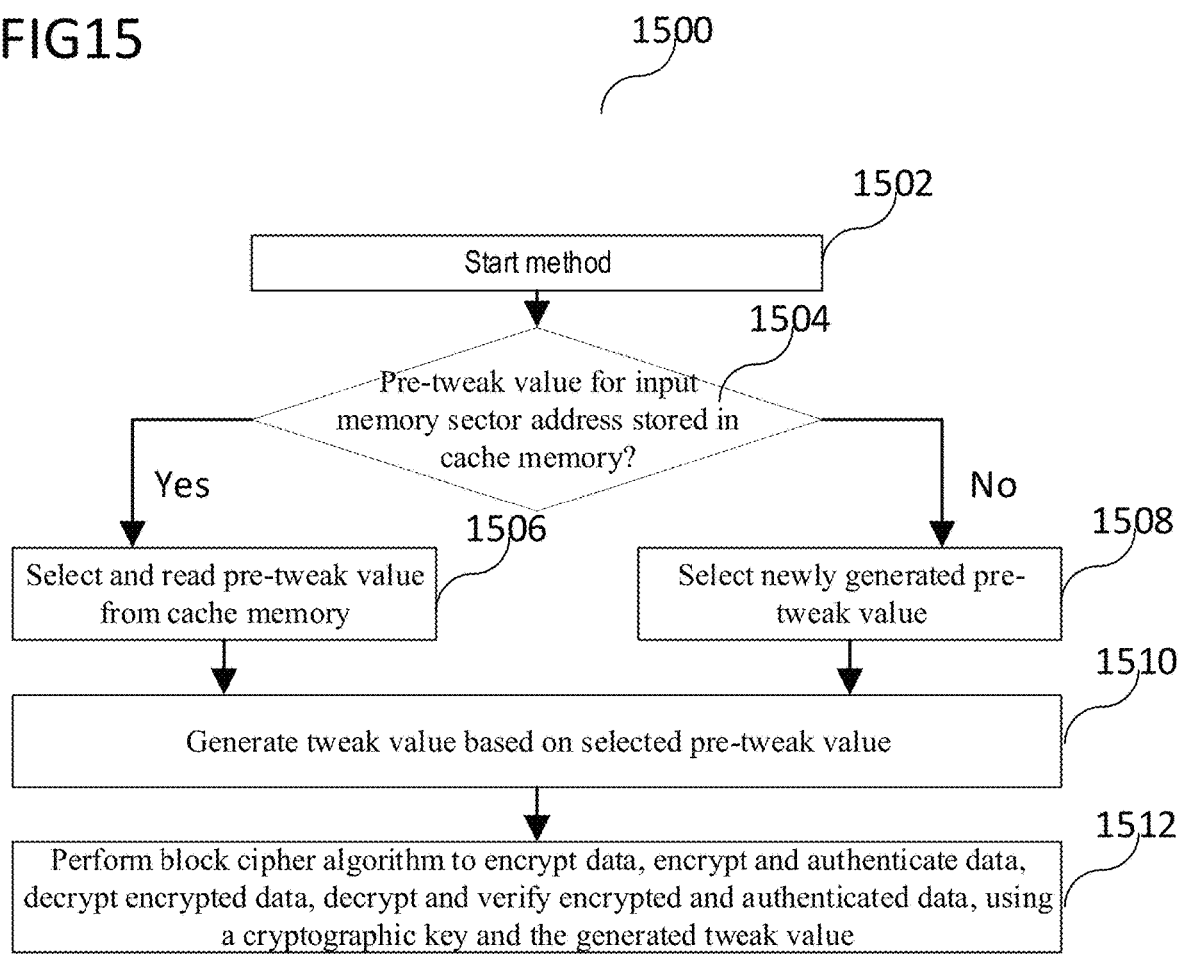

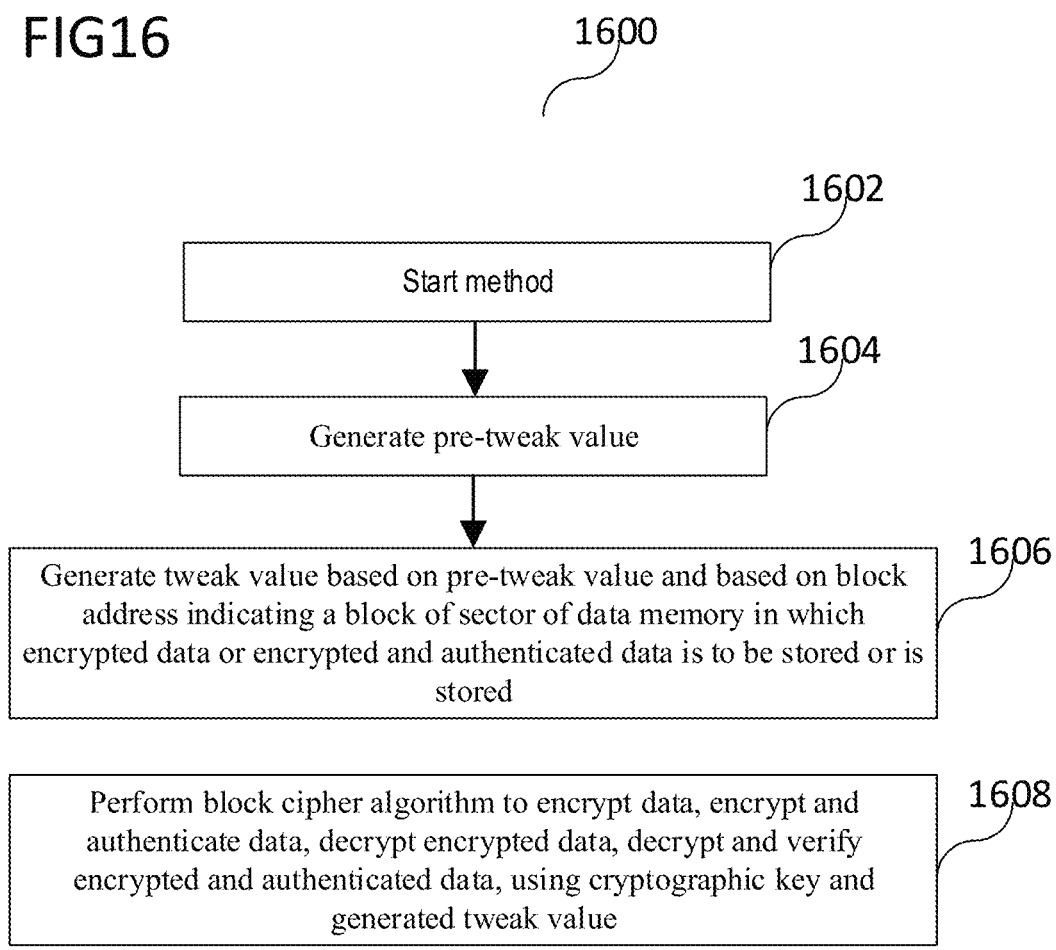

DATA CRYPTOGRAPHIC DEVICES AND MEMORY SYSTEMS

CROSS REFERENCE TO RELATED APPLICATION

This application claims priority to German Patent Application No. 102019128528.3 filed on Oct. 22, 2019, the content of which is incorporated by reference herein in its entirety.

TECHNICAL FIELD

Various aspects of this disclosure relate generally to data cryptographic devices, memory systems, methods of operating a data cryptographic device and methods of operating a memory system.

BACKGROUND

Various processor architectures such as next generation automotive microcontroller architectures often rely on external memories.

External memories may be non-volatile memories (e.g. to store computer program code images or to log critical safety data in case of safety failures) or volatile memories (e.g. to provide stored data with low latency execution of software as compared to non-volatile memories or to store intermediate data for subsequent data processing).

SUMMARY

Various implementations provide a data cryptographic device. The data cryptographic device may include a pre-tweak generator configured to generate pre-tweak values, a pre-tweak value cache memory configured to store one or more pre-tweak values generated by the pre-tweak generator, a pre-tweak value selector configured to check whether a pre-tweak value for an input memory address is stored in the pre-tweak value cache memory, the input memory address indicating an address of a data memory in which encrypted data or encrypted and authenticated data is to be stored or is stored, in case the pre-tweak value for the input memory address is stored in the pre-tweak value cache memory, reading the pre-tweak value from the pre-tweak value cache memory, in case the pre-tweak value for the input memory address is not stored in the pre-tweak value cache memory to select the pre-tweak value generated by the pre-tweak generator. The data cryptographic device may further include a tweak generator configured to generate a tweak value based on the selected pre-tweak value, and a block cipher configured to perform at least one block cipher algorithm to at least one of encrypt data, encrypt and authenticate data, decrypt encrypted data, decrypt and verify encrypted and authenticated data, using a cryptographic key and the generated tweak value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the implementation. In the following description, various implementations of the implementation are described with reference to the following drawings, in which:

FIG. 15 shows a method of operating a data cryptographic device in accordance with various implementations; and FIG. 16 shows a method of operating a data cryptographic device in accordance with various implementations

DETAILED DESCRIPTION

Figure 1:
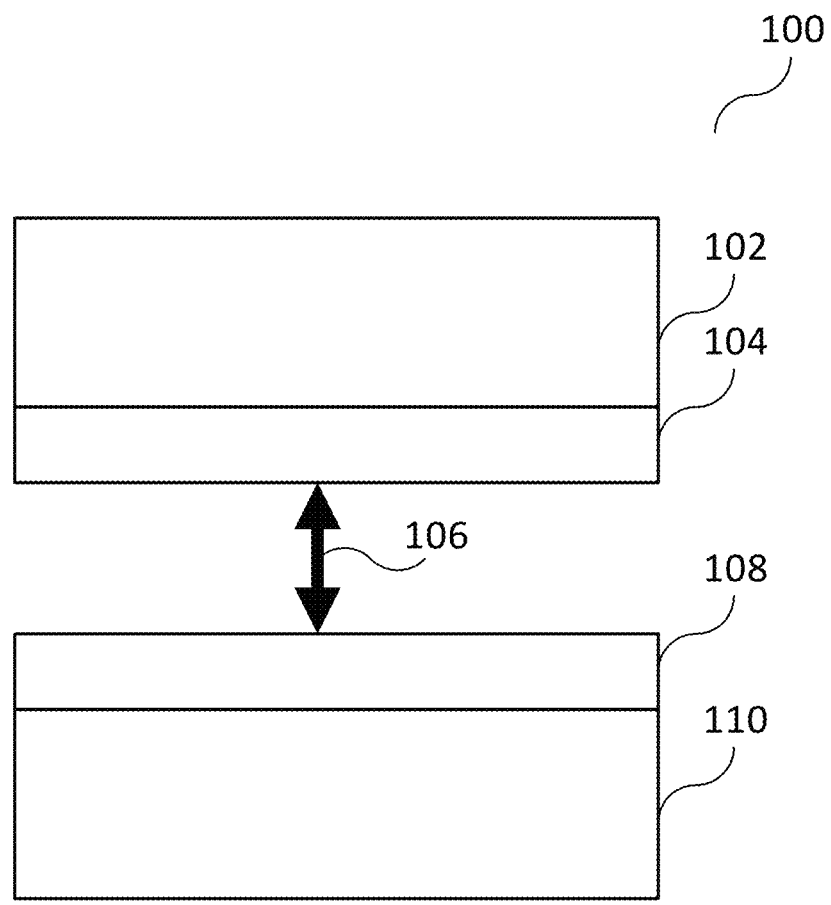
FIG. 1 shows a memory system in accordance with various implementations.

The following detailed description refers to the accompanying drawings that show, by way of illustration, specific details and implementations in which the implementation may be practiced.

The word "example" is used herein to mean "serving as an example, instance, or illustration". Any implementation or design described herein as "example" is not necessarily to be construed as preferred or advantageous over other implementations or designs.

A memory used in the implementations may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an RRAM (Resistive Random Access Memory), an MRAM (Magnetoresistive Random Access Memory) or a PCRAM (Phase Change Random Access Memory).

In the context of this description, a "volatile memory cell" may be understood as a memory cell storing data, the data being refreshed during a power supply voltage of the memory system being active, in other words, in a state of the memory system, in which it is provided with power supply voltage. A "volatile memory cell" may be understood as a memory cell storing data, the data being refreshed during a refresh period in which the memory cell is provided with a power supply voltage corresponding to the level of the stored data. Illustratively, a "volatile memory cell" may be understood as a memory cell that requires power to maintain the stored information; it retains its contents while powered on but when the power is interrupted, the stored data is quickly lost.

A "non-volatile memory cell" may be understood as a memory cell storing data even if it is not active. A memory cell may be understood as being not active e.g. if currently access to the content of the memory cell is inactive. In another implementation, a memory cell may be understood as being not active e.g. if the power supply is inactive. Furthermore, the stored data may be refreshed on a regular timely basis, but not, as with a "volatile memory cell" every few picoseconds or nanoseconds or milliseconds, but rather in a range of hours, days, weeks or months. Alternatively, the data may not need to be refreshed at all in some designs.

In an implementation, a "circuit" may be understood as any kind of a logic implementing entity, which may be special purpose circuitry or a processor executing software stored in a memory, firmware, or any combination thereof. Thus, in an implementation, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative implementation.

FIG. 1 shows a memory system 100 which may be provided in various technical contexts such as e.g. in an automotive application. It is to be noted that the memory system 100 may be provided for other applications such as in any application which desires or requires a cryptographic service such as the encryption of data to be stored in a processor-external memory or the decryption of encrypted data e.g. stored in a processor-external memory. Furthermore, it is to be noted that the data cryptographic devices and the corresponding methods may be provided independent from a specific memory architecure and e.g. independent from the memory system 100.

The example memory system 100 may include one or more application cores 102 such as one or more application processors 102 (in general one or more processors 102). Each processor 102 may include a single-core processor or a multi-core processor. Each processor may be implemented by a virtual machine. A virtual machine is to be understood as an emulation of a computer system. A virtual machine is based on a predefined computer architecture and provides the functionality of a computer or a processor. The implementation of a virtual machine may involve hardware, software, or a combination thereof. A virtual machine may be a system virtual machine that provides a substitute of a real machine, thereby providing the functionality needed to execute an entire operating system, for example. A virtual machine may also be a process virtual machine that is designed to execute a computer program in a platform-independent environment. The memory system 100 may further include a cache memory 104 associated with or being part of the one or more processors 102. The cache memory 104 may include a desired number of cache levels such as a second level cache and optionally a third level cache and, if desired, additional caches. The cache memory 104 may be coupled to an encrypt/decrypt accelerator device 108, e.g. via an interface 106 such as a bus interface 106. The encrypt/decrypt accelerator device 108 may include a data cryptographic device which will be explained in more detail below. Furthermore, the memory system 100 may further include a processor-external memory 110 which in turn may include one or more non-volatile memories and/or one or more volatile memories. Furthermore, the memory system 100 may further include a processor-external memory controller (configured to control e.g. the access (read or write) to the processor-external memory 110) and an interface to the processor-external memory 110. Illustratively, the encrypt/decrypt accelerator device 108 is configured to encrypt data provided by the one or more processors 102 via the interface 106 and to store the encrypted data in the processor-external memory 110. Furthermore, the encrypt/decrypt accelerator device 108 is configured to read encrypted data from the processor-external memory 110, to decrypt the read encrypted data and to provide the decrypted data to the one or more processors 102 via the interface 106 for further processing.

Such a memory system 100 faces various challenges. One challenge may be seen in the latency to access data from the processor-external memory 110. As compared to an access time required to access data stored in processor-internal memory (e.g. the cache memory 104) the access time to access data stored in processor-external memory 110 may be up to 10 to 100 times longer. In various aspects, the latency may become important for program code execution from the processor-external memory 110. Another challenge may be seen in that most processor-external memory components that are available in the market are coming from consumer market. The consumer market usually does not have strict requirements for security and safety as demanded e.g. in the automotive industry. Moreover, processor-external memory components may be exposed to security vulnerabilities due to the presence of a physical interface. Further, a processor-external memory 110 is usually not qualified for any ASIL (Automotive Safety Integrity Level) rating.

As will be illustrated further below, various implementations may provide a cache based memory hierarchy architecture which overcomes the above described latency issue.

Illustratively, various implementations may exploit the temporal and spatial locality principle. A cache may provide low latency access to program code or application data in case of a cache hit ("data" in general includes program code as well as application data or any other type of data to be stored or stored in the processor-external memory 110). However, a refill from the processor-external memory 110 may be required in case of a cache miss. A cache miss may lead to a penalty due to the associated long access time needed to access data to be stored in or read from the processor-external memory 110. Cache lines typically contain multiple memory words. Moreover, certain cache memory architectures may support a so-called "critical word first" approach in order to minimize the cache miss penalty.

To provide a security solution, the data cryptographic device of the encrypt/decrypt accelerator device 108 may implement one or more encryption algorithms (e.g. one or more symmetric encryption algorithms) and/or one or more decryption algorithms (e.g. one or more symmetric decryption algorithms). By way of example, the data cryptographic device may implement one or more block cipher algorithms, e.g. one or more of the following encryption/decryption algorithms: Advanced Encryption Standard (AES), Data Encryption Standard (DES), International Data Encryption Algorithm (IDEA), RC5, and Blowfish. Although the following implementation will be described using the AES, it is to be noted that the data cryptographic device may implement any other desired (e.g. symmetric) encryption/decryption algorithm. Moreover, the data cryptographic device may implement one or more modes of a respective encryption/decryption algorithm. By way of example, the data cryptographic device may implement a tweaked codebook mode with ciphertext stealing algorithm of AES, e.g. AES-XTS mode (it is to be noted that the XTS mode may be provided also for other block cipher algorithms). It is to be noted that in various implementations, any other operation mode of the implemented algorithm may be provided. Various algorithms may have limitations in that they may not be capable of encrypting/decrypting data of arbitrary memory blocks within a memory sector of the processor-external memory 110. A memory sector is to be understood a physical transaction size of the processor-external memory 110. Each memory sector of the processor-external memory 110 may include a plurality of memory blocks.

To optionally in addition also provide a safety solution for the processor-external memory 110, various implementations may provide for an introduction of redundancy for detecting and possibly in addition for correcting errors in the data, e.g. in the encrypted data and/or in the memory address (e.g. in the memory sector address). The redundancy may include one or more error detection codes (EDC) (and/or one or more error correction codes (ECC)) and/or complete duplication of the data in order to achieve a high ASIL level.

Figure 2:
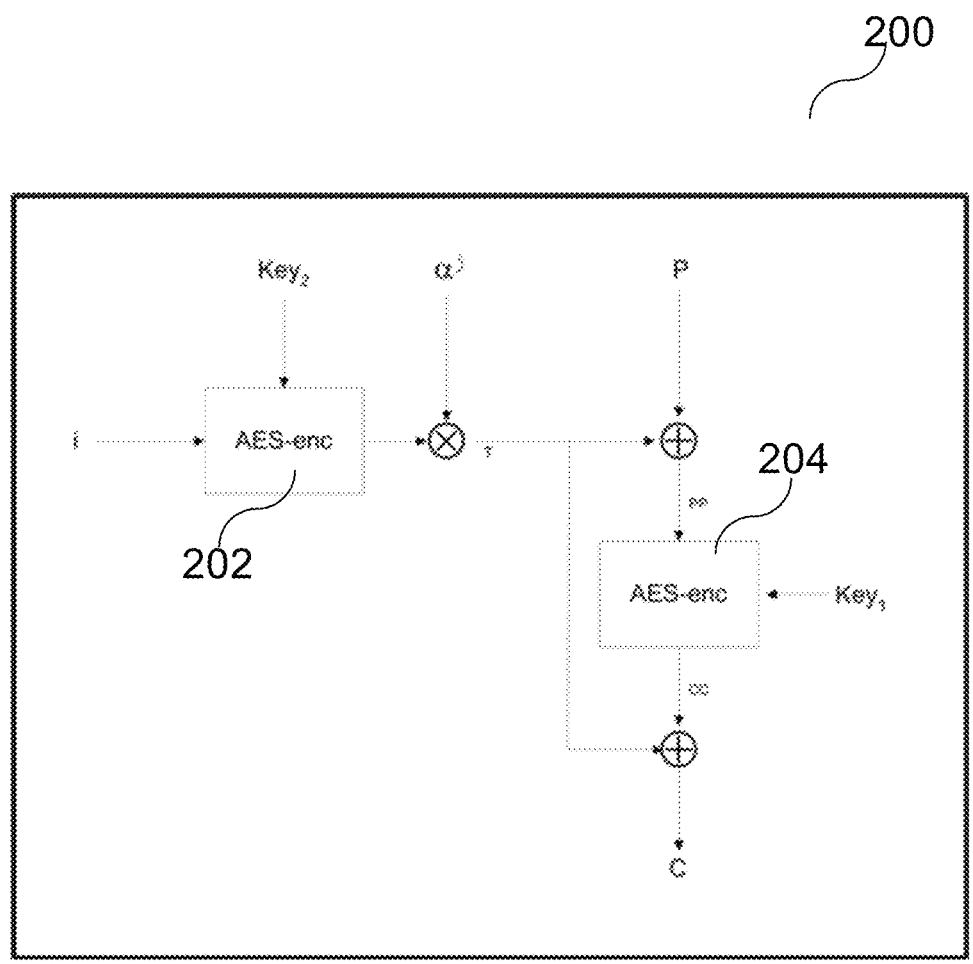
FIG. 2 shows a block diagram illustrating a conventional AES-XTS algorithm.
Figure 3:
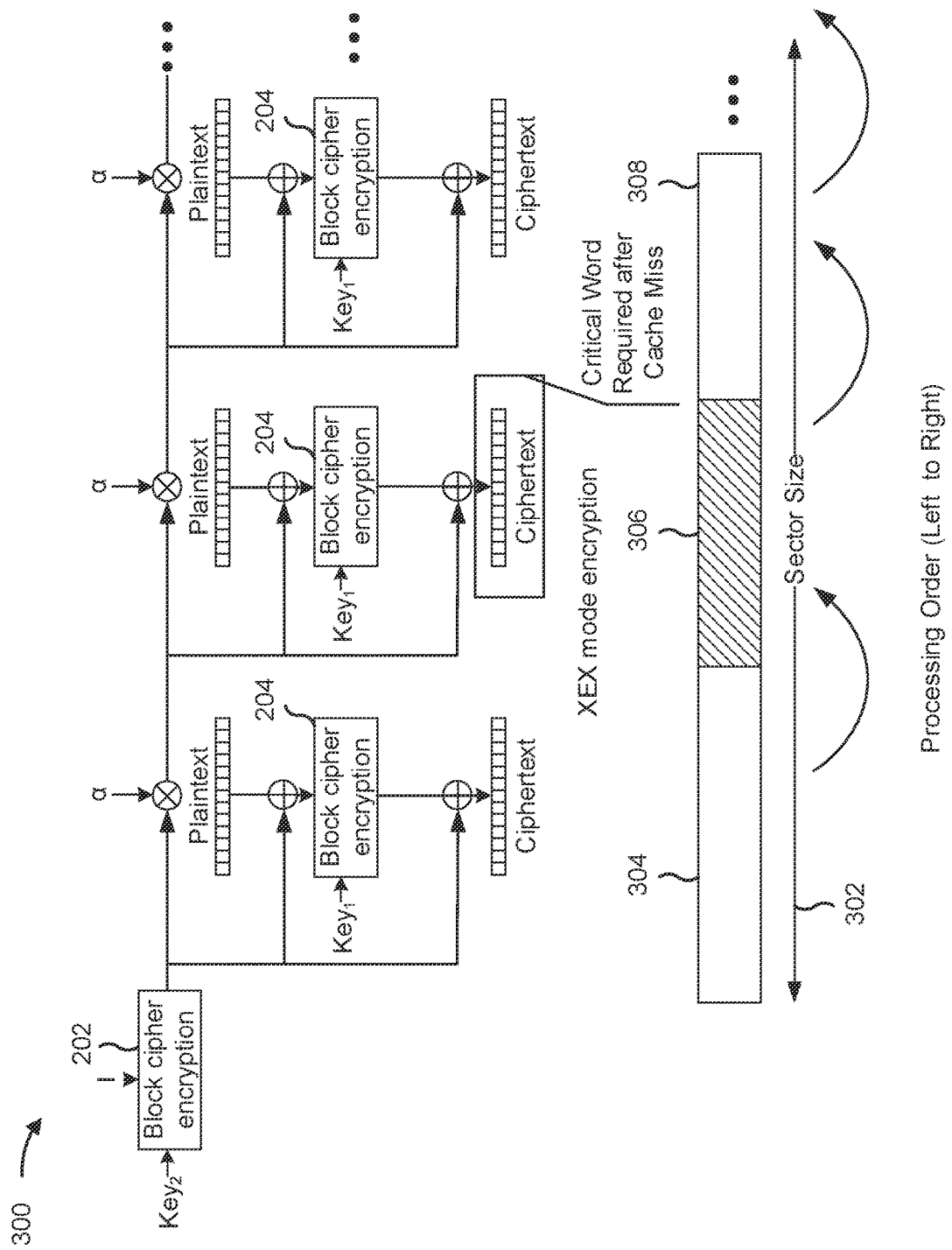
FIG. 3 shows a block diagram illustrating a chaining concept and the processing order of a conventional AES-XTS algorithm.

FIG. 2 shows a block diagram 200 illustrating a conventional AES-XTS algorithm to encrypt data and store the encrypted data in a memory. FIG. 3 shows a block diagram 300 illustrating a chaining concept and the processing order of a conventional AES-XTS algorithm.

The AES-XTS encryption algorithm typically uses two cryptographic symmetric AES keys (e.g. a first AES key $Key_1$ and a second AES key $Key_2$). A first AES block encryption circuit 202, which implements an AES block encryption algorithm, receives a memory sector address (i) (in other words a number of the memory sector—the memory sector address (i) remains the same for the entire data portion of the memory sector) indicating the sector of the memory into which the encrypted data is to be stored and the second AES key $Key_2$ as inputs and calculates the encrypted memory sector address using the second AES key $Key_2$ (in short: AES-enc($Key_2$, i)). This operation is performed once per memory sector. The AES-XTS algorithm then applies a bit-wise multiplication to the encrypted memory sector address and a primitive element $\alpha^j$ of a Galois field GF ($2^{128}$) defined by a predefined polynomial x to generate a tweak value T (in short: T←AES enc($Key_2$, i) $\otimes \alpha^j$). Furthermore, the AES-XTS algorithm applies an XOR operation to the tweak value T and the (plaintext) data P to be encrypted, thereby generating XORed data PP (in short: PP←P⊕T). The (plaintext) data P may be provided in 128 bit chunks or in 256 bit chunks from a memory sector. A second AES block encryption circuit 204, which also implements an AES block encryption algorithm, receives the XORed data PP and the first AES key $Key_1$ as inputs and calculates the encrypted XORed data CC using the first AES key $Key_1$ (in short: CC←AES-enc($Key_1$, PP)). Then, the first AES key $Key_1$ is the cryptographic (and e.g. symmetric) key provided to encrypt the data. This operation is usually performed a plurality of times depending on the size of the memory sector. Finally, a further XOR operation is applied to the tweak value T and the encrypted XORed data CC to generate encrypted data C (also referred to as ciphertect C).

As shown in FIG. 3, the AES-XTS encryption algorithm processes the data of memory blocks 304, 306, 308 (e.g. a first memory block 304, a second memory block 306, and a third memory 308, etc.) within a memory sector 302 sequentially, e.g. memory block 304, 306, 308 by memory block 304, 306, 308. Illustratively, the AES-XTS encryption algorithm processes the data memory sector 302 by memory sector 302 and in accordance with a linear sequence of memory blocks 304, 306, 308 within one memory sector 302. In the conventional AES-XTS algorithm, it is not possible to encrypt or decrypt data from an arbitrary memory block 304, 306, 308 within a memory sector 302. Thus, the decryption latency depends on the position of the requested memory block 304, 306, 308 within a memory sector 302. Worst case latency occurs when the last memory block 304, 306, 308 within a memory sector 302 is requested for decryption. By way of example, as shown in FIG. 3, in case of a cache miss for the second memory block 306, the AES-XTS algorithm has to process the first memory block 304 of the requested memory sector 302 first before it can process the requested second memory block 306. Thus, the conventional AES-XTS algorithm faces a variable latency for a critical (requested) word (in other words memory block) depending on the location of the critical word within a memory sector 302. Furthermore, the AES-XTS algorithm usually decrypts more data than the requesting application program requires for every cache miss. This latency issue becomes even more evident when considering that a usual cache line has a size of e.g. 512 bits (64 Byte), a (AES-XTS) memory sector may have a usual size in the range e.g. from 4096 bits to 16384 bits (512 Byte to 2 KByte) and that a usual (AES-XTS) memory block may have a usual size of e.g. 128 bits.

Figure 4:
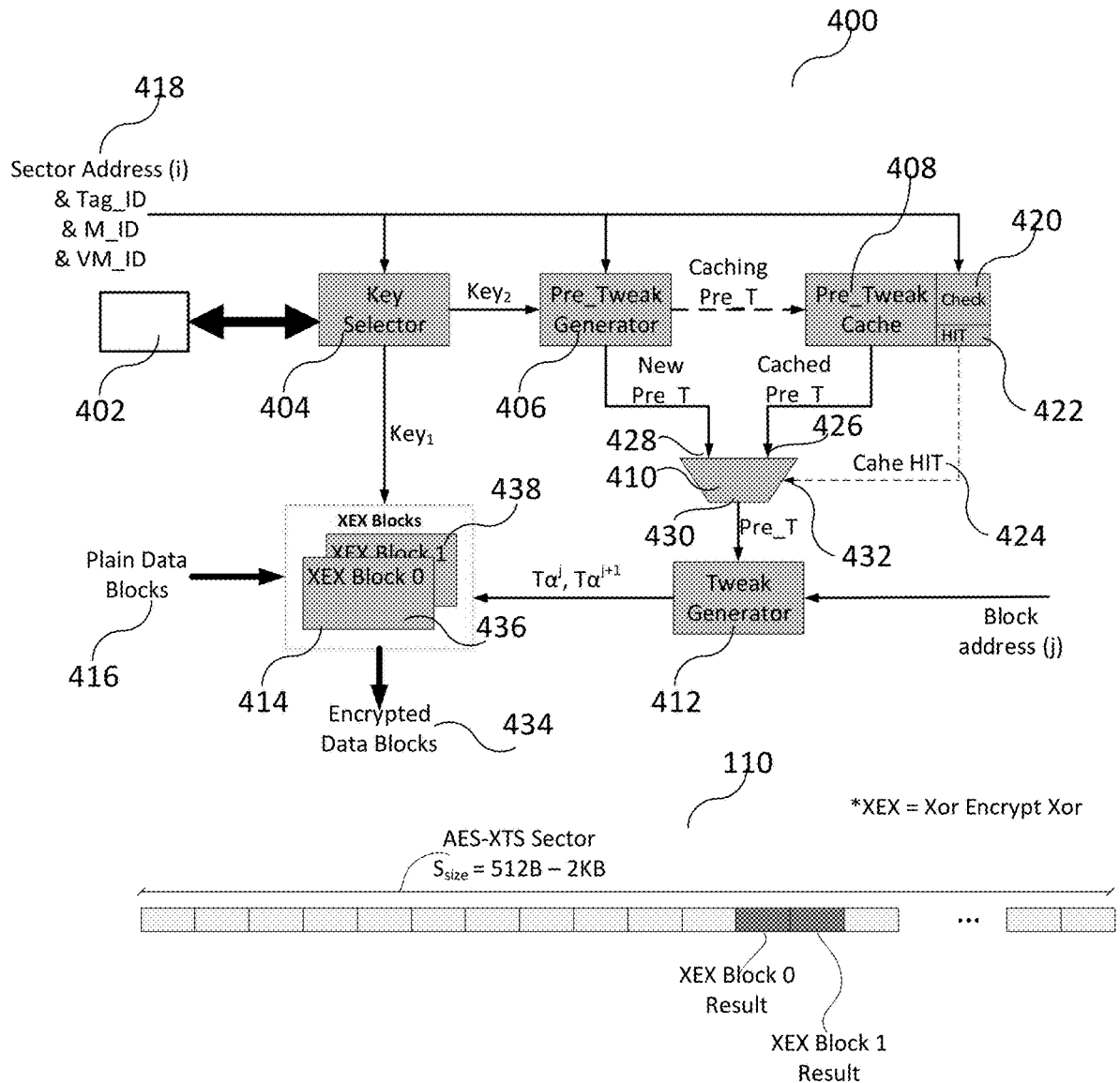
FIG. 4 shows a data cryptographic device in accordance with various implementations.

FIG. 4 shows a data cryptographic device 400 in accordance with various implementations.

The data cryptographic device 400 may be configured to implement the AES-XTS algorithm to encrypt data to be encrypted. The data cryptographic device 400 may include a key memory 402 storing cryptographic keys, e.g. symmetric cryptographic (e.g. AES) keys (such as the first AES key $Key_1$ and the second AES key $Key_2$). The data cryptographic device 400 may further include a key selector 404, a pre-tweak generator 406, a pre-tweak cache 408, a multiplexer 410 (as an example implementation of a pre-tweak value selector), a tweak generator 412, and an AES-XTS circuit 414 (as one example implementation of a block cipher).

As will be described in more detail below, the data cryptographic device 400 allows to encrypt any arbitrary memory block within a memory sector of the processor-external memory 110. Furthermore, the data cryptographic device 400 allows to switch between memory sectors with low latency. Moreover, the data cryptographic device 400 allows to handly multiple cryptographic (e.g. symmetric) keys, which may even have variable key lengths. In various aspects, the data cryptographic device 400 allows to switch between a safe mode and a performance mode.

As shown in FIG. 4, the data cryptographic device 400 may receive (e.g. via the interface 106)
- data to be encrypted 416 and optionally in addition to be stored in the processor-external memory 110 (e.g. also referred to as plain data blocks 416); and
- an encrypt instruction 418 (which may result form a memory address and one or more identifiers such as one or more of the identifiers indicated below) to encrypt the data to be encrypted 416 and optionally to store the encrypted data in the processor-external memory 110; the encrypt instruction 418 may include one or more of the following encrypt instruction parameters:

a memory address including a memory sector address (i) (Sector Address (i)), indicating a memory sector of the processor-external memory 110 (in general a data memory) and a memory block address indicating a memory block within the indicated memory sector of the processor-external memory 110 (in general a data memory) in which the encrypted data or encrypted and authenticated data is to be stored;

a memory tag identifier (Tag_ID) identifying a memory tag associated with a portion of the processor-external memory 110 (in general a data memory) in which the encrypted data or encrypted and authenticated data is to be stored;

a master identifier (M_ID) identifying a master device which includes the one or more processors and which generated the encrypt instruction 418 (in general, other master identifiers which may e.g. identify a direct memory access (DMA) master device or an accelerator master device (which may even include one or more DMAs));

a virtual machine (VM_ID) identifying a virtual machine of the master device identified by the master identifier, wherein the virtual machine implements the device requesting the cryptographic service of encrypting the data.

Upon receipt of the encrypt instruction 418, the data cryptographic device 400 may divide the received memory address into the memory sector address and the memory block address of the memory sector indicated by the memory sector address.

The key selector 404 reads the cryptographic keys required to perform the respectively instructed encryption algorithm (in accordance with the encrypt instruction parameters) from the key memory 402. Illustratively, the key selector 404 uses the memory sector address together with other received control information (such as the one or more encrypt instruction parameters outlined above) to select a cryptographic key pair provided for the current memory sector indicated by the memory sector address from a plurality of stored cryptographic key pairs stored in the key memory 402. By way of example, the key selector 404 selects the first AES key $Key_1$ and the second AES key $Key_2$ and supplies the second AES key $Key_2$ to the pre-tweak generator 406 and the first AES key $Key_1$ to the AES-XTS circuit 414 (in FIG. 4 shown as a plurality of XEX (XOR Encrypt XOR) Blocks 436, 438).

The data cryptographic device 400 may further supply the memory sector address of the encrypt instruction 418 to a cache controller (not shown in FIG. 4) of the pre-tweak cache 408 as well as to the pre-tweak generator 406.

The cache controller checks (block 420) if the pre-tweak value for the input memory address (e.g. for the memory sector address of the encrypt instruction 418) is already residing in the pre-tweak cache 408.

In case the pre-tweak value for the input memory address (e.g. for the memory sector address of the encrypt instruction 418) is already residing in the pre-tweak cache 408 (in other words in case of a cache hit) (block 422), the cache controller generates a cache signal 424 having a first control value (cache hit value) and supplies the same to a control input 432 of the multiplexer 410 as a multiplexer control signal. Furthermore, the cache controller reads the found pre-tweak value from the pre-tweak cache 408 and supplies the same to a first input 426 of the multiplexer 410. The cache signal 424 having the first control value causes the multiplexer 410 to select the pre-tweak value (read from the pre-tweak cache 408) applying at the first input 426 of the multiplexer 410 and to provide the same at an output 430 of the multiplexer 410. In this case, the pre-tweak generator 406 does not need to newly calculate the pre-tweak value for the input memory address (e.g. for the memory sector address of the encrypt instruction 418).

In case the pre-tweak value for the input memory address (e.g. for the memory sector address of the encrypt instruction 418) is not already residing in the pre-tweak cache 408 (in other words in case of a cache miss) (block 422), the cache controller generates the cache signal 424 having a second control value (cache miss value) and supplies the same to the control input 432 of the multiplexer 410 as the multiplexer control signal. Furthermore, in this case, the pre-tweak generator 406 newly calculates the pre-tweak value for the input memory address (e.g. for the memory sector address of the encrypt instruction 418), stores the same in the pre-tweak cache 408 and also supplies the same to a second input 428 of the multiplexer 410. Illustratively, the pre-tweak generator 406 takes the memory sector address of the encrypt instruction 418 and encrypts it in accordance with e.g. the AES algorithm using the selected second AES key $Key_2$. The cache signal 424 having the second control value causes the multiplexer 410 to select the (newly calculated) pre-tweak value applying at the second input 428 of the multiplexer 410 and to provide the same at the output 430 of the multiplexer 410.

The pre-tweak value provided at the output 430 of the multiplexer 410 is supplied to the tweak generator 412.

The tweak generator 412 will take the supplied pre-tweak value along with the memory block address (j) of the memory address within the memory sector indicated by the memory sector address (i) in the encrypt instruction 418 to calculate a tweak value $T\alpha^j$ for the memory block indicated by the received memory block address (j) as described above with reference to FIG. 2 in conventional manner.

There are different options to implement the tweak generator 412. The fastest implementation is a pure combinational circuit, which calculates the tweak value $T\alpha^j$ in a single cycle. A smaller implementation with fewer logic gates may be provided if the tweak value $T\alpha^j$ is calculated over multiple cycles.

The tweak value $T\alpha^j$ may be supplied to the AES-XTS circuit 414. The AES-XTS circuit 414 may encrypt the data to be encrypted 416 using the supplied first AES key $Key_1$ and the supplied tweak value $T\alpha^j$, thereby generating encrypted data 434 (which may be provided as encrypted data blocks 434). The encrypted data 434 may be stored in the processor-external memory 110 in the memory block (j) of the memory sector (i) as indicated in the encrypt instruction 418.

Optionally, the AES-XTS circuit 414 may provide a parallel processing of the supplied plain data blocks 416. For a parallel execution of the supplied plain data blocks 416 multiple XEX (XEX: XOR Encrypt XOR) engines (in other words XEX blocks) 436, 438 may be provided. In this case, the tweak generator 412 may not only generate the tweak value $T\alpha^j$ for the current memory block (j), but also the tweak value $T\alpha^{j+1}$ for the neighbouring memory block (j+1) if multiple XEX engines 436, 438 are present in the AES-XTS circuit 414.

Figure 5:
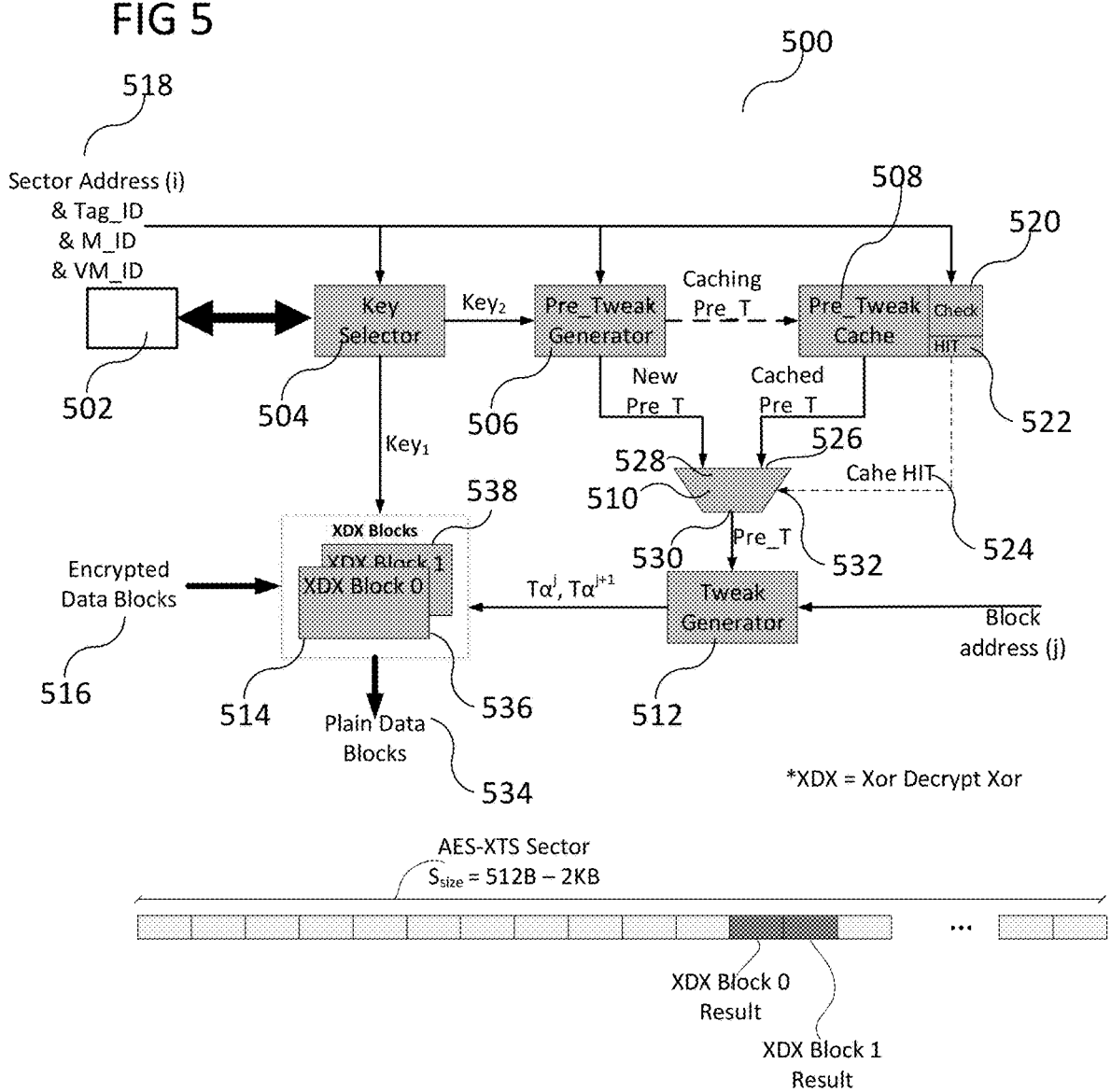
FIG. 5 shows a data cryptographic device in accordance with various implementations.

FIG. 5 shows a data cryptographic device 500 in accordance with various implementations.

The data cryptographic device 500 may be configured to implement the AES-XTS algorithm to decrypt encrypted data. In general, the data cryptographic device 500 is similar to the data cryptographic device 400 as shown in FIG. 4. The data cryptographic device 500 may include a key memory 502 storing cryptographic keys, e.g. symmetric cryptographic (e.g. AES) keys (such as the first AES key $Key_1$ and the second AES key $Key_2$). The data cryptographic device 500 may further include a key selector 504, a pre-tweak generator 506, a pre-tweak cache 508, a multiplexer 510 (as an example implementation of a pre-tweak value selector), a tweak generator 512, and an AES-XTS circuit 514 (as one example implementation of a block cipher).

As will be described in more detail below, the data cryptographic device 500 allows to decrypt any arbitrary memory block within a memory sector of the processor-external memory 110. Furthermore, the data cryptographic device 500 allows to switch between memory sectors with low latency. Moreover, the data cryptographic device 500 allows to handly multiple cryptographic (e.g. symmetric) keys, which may even have variable key lengths. In various aspects, the data cryptographic device 500 allows to switch between a safe mode and a performance mode.

As shown in FIG. 5, the data cryptographic device 500 may receive (e.g. via the interface 106):

encrypted data 516 to be decrypted; optionally, the encrypted data 516 may be stored in the processor-external memory 110 (e.g. also referred to as encrypted data blocks 516); and a decrypt instruction 518 to decrypt the encrypted data 516 to be decrypted, which may optionally be stored in the processor-external memory 110; the decrypt instruction 518 may include one or more of the following decrypt instruction parameters:

a memory address including a memory sector address (i) (Sector Address (i)), indicating a memory sector of the processor-external memory 110 (in general a data memory) and a memory block address (j) indicating a memory block within the indicated memory sector (i) of the processor-external memory 110 (in general a data memory) in which the encrypted data 516 to be decrypted or encrypted and authenticated data to be decrypted is stored;

a memory tag identifier (Tag_ID) identifying a memory tag associated with a portion of the processor-external memory 110 (in general a data memory) in which the encrypted data or encrypted and authenticated data is stored;

a master identifier (M_ID) identifying a master device which includes the one or more processors and which generated the decrypt instruction 518 (in general, other master identifiers which may e.g. identify a direct memory access (DMA) master device or an accelerator master device (which may even include one or more DMAs));

virtual machine (VM:ID) identifying a virtual machine of the master device identified by the master identifier.

Upon receipt of the decrypt instruction 518, the data cryptographic device 500 may divide the received memory address into the memory sector address and the memory block address of the memory sector indicated by the memory sector address.

The key selector 504 reads the cryptographic keys required to perform the respectively instructed decryption algorithm (in accordance with the decrypt instruction parameters) from the key memory 502. Illustratively, the key selector 404 uses the memory sector address (i) together with other received control information (such as the one or more decrypt instruction parameters outlined above) to select a cryptographic key pair provided for the current memory sector indicated by the memory sector address (i) from a plurality of cryptographic key pairs stored in the key memory 502. By way of example, the key selector 404 selects the first AES key $Key_1$ and the second AES key $Key_2$ and supplies the second AES key $Key_2$ to the pre-tweak generator 506 and the first AES key $Key_1$ to the AES-XTS circuit 514 (in FIG. 4 shown as including one or more XDX (XOR Decrypt XOR) Blocks 536, 538). The data cryptographic device 500 may further supply the memory sector (i) address of the decrypt instruction 518 to a cache controller (not shown in FIG. 5) of the pre-tweak cache 508 as well as to the pre-tweak generator 506.

The cache controller checks (block 520) if the pre-tweak value for the input memory address (e.g. for the memory sector address of the decrypt instruction 518) is already residing in the pre-tweak cache 508.

In case the pre-tweak value for the input memory address (e.g. for the memory sector address of the decrypt instruction 518) is already residing in the pre-tweak cache 508 (in other words in case of a cache hit) (block 522), the cache controller generates a cache signal 524 having a first control value (cache hit value) and supplies the same to a control input 532 of the multiplexer 510 as a multiplexer control signal. Furthermore, the cache controller reads the found pre-tweak value from the pre-tweak cache 508 and supplies the same to a first input 526 of the multiplexer 510. The cache signal 524 having the first control value causes the multiplexer 510 to select the pre-tweak value (read from the pre-tweak cache 508) and apply the same at the first input 526 of the multiplexer 510 and to provide the same at an output 530 of the multiplexer 510. In this case, the pre-tweak generator 506 does not need to newly calculate the pre-tweak value for the input memory address (e.g. for the memory sector address of the decrypt instruction 518).

In case the pre-tweak value for the input memory address (e.g. for the memory sector address of the decrypt instruction 518) is not already residing in the pre-tweak cache 508 (in other words in case of a cache miss) (block 522), the cache controller generates the cache signal 524 having a second control value (cache miss value) and supplies the same to the control input 532 of the multiplexer 510 as the multiplexer control signal. Furthermore, in this case, the pre-tweak generator 506 newly calculates the pre-tweak value for the input memory address (e.g. for the memory sector address of the decrypt instruction 518), stores the same in the pre-tweak cache 508 and supplies the same to a second input 528 of the multiplexer 510. Illustratively, the pre-tweak generator 506 takes the memory sector address of the decrypt instruction 518 and encrypts it using e.g. the AES algorithm with the selected second AES key $Key_2$. The cache signal 524 having the second control value causes the multiplexer 510 to select the (newly calculated) pre-tweak value applying at the second input 528 of the multiplexer 510 and to provide the same at the output 530 of the multiplexer 510.

The pre-tweak value provided at the output 530 of the multiplexer 510 is supplied to the tweak generator 512.

The tweak generator 512 takes the supplied pre-tweak value along with the block address (j) of the memory address within the memory sector indicated by the memory sector address in the decrypt instruction 518 to calculate a tweak value $T\alpha^j$ as described above with reference to FIG. 2 in conventional manner.

There are different options to implement the tweak generator 512 also for decryption. The fastest implementation is a pure combinational circuit, which calculates the tweak value $T\alpha^j$ in a single cycle. A smaller implementation with fewer logic gates may be provided if the tweak value $T\alpha^j$ is calculated over multiple cycles.

The tweak value $T\alpha^j$ may be supplied to the AES-XTS circuit 514. The AES-XTS circuit 514 may decrypt the encrypted data 516 to be decrypted using the supplied first AES key $Key_1$ and the supplied tweak value $T\alpha^j$, thereby generating decrypted data 534 (which may be provided as plain data blocks 534). The decrypted data 534 may be read from the processor-external memory 110 in the memory block (j) of the memory sector (i) as indicated in the decrypt instruction 518.

Optionally, the AES-XTS circuit 514 may provide a parallel processing of the supplied plain data blocks 516. For a parallel execution of the supplied plain data blocks 516, multiple XDX (XDX: XOR Decrypt XOR) engines (in other words, multiple XDX blocks) 536, 538 may be provided. In this case, the tweak generator 512 may not only generate the tweak value $T\alpha^1$ for the current memory block (j), but also the tweak value $T\alpha^{j+1}$ for the neighbouring memory block (j+1) if multiple XEX engines 536, 538 are present in the AES-XTS circuit 514.

In various aspects of this disclosure, various components of the data cryptographic device (data encryption device) 400 as shown in FIG. 4 and components of the data cryptographic device (data decryption device) 500 as shown in FIG. 5 may be merged. In this implementation even when merging most components, separate XEX blocks 436, 438 and XDX blocks 536, 538 should be provided. The selection of the XEX blocks 436, 438 or the XDX blocks 536, 538 may be based on a control signal indicating whether the received instruction 418, 518 represents a read transaction (and thus a decrypt instruction 518 resulting in a selection of the XDX blocks 536, 538) or write transaction (and thus an encrypt instruction 418 resulting in a selection of the XEX blocks 436, 438).

As described above, the data cryptographic devices 400, 500, when configured to only encrypt and/or decrypt data provide a security mechanism. In various aspects of this disclosure, however, data cryptographic devices are provided which are configured to additionally provide a safety mechanism.

By way of example, a data cryptographic device may be configured to provide a safe and secure memory data write function.

Figure 6:
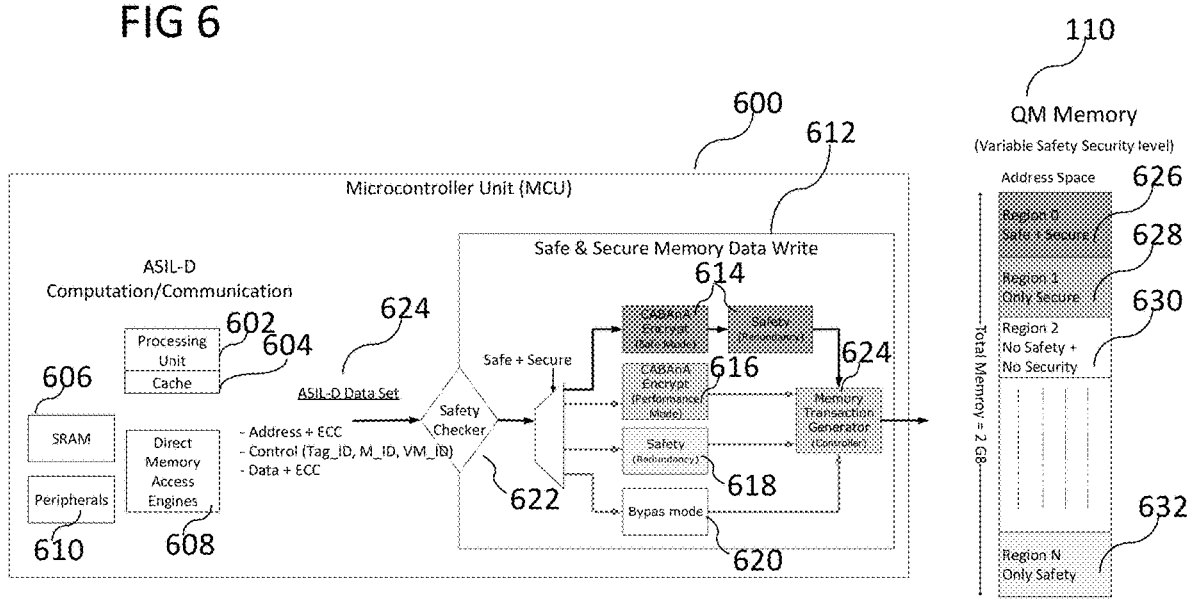
FIG. 6 shows a microcontroller unit in accordance with various implementations.

FIG. 6 shows a microcontroller unit (MCU) 600 in accordance with various implementations providing a ASIL level D. The MCU 600 may include various computation and/or communication components such as one or more processing units 602 with associated one or more cache memories 604, a volatile memory 606 such as SRAM (Static Random Access Memory), one or more direct memory access (DMA) engines 608, and optionally one or more additional peripheral devices 610.

The MCU 600 may further implement a multi-mode data cryptographic device 612. The multi-mode data cryptographic device 612 may implement one or more of the following operation modes, which will be explained in more detail further below:
  safe and secure memory data write mode 614; and/or
  secure memory data write mode 616; and/or
  safe memory data write mode 618; and/or
  bypass memory data write mode 620.

The MCU 600 may further include a mode selector 622 configured to select an operation mode offered by the multi-mode data cryptographic device 612, e.g. an operation mode as outlined above. The mode selector 622 may be configured to select an operation mode based on a mode selection signal which may be provided by a user or which may be part of an input instruction 624 which may be received (e.g. via the interface 106) by the mode selector 622, and which may include an ASIL-D data set 624. The ASIL-D data set 624 may include:
  data to be encrypted and optionally in addition to be stored in the processor-external memory 110 (e.g. also referred to as plain data blocks 416), optionally in addition data redundancy (e.g. an error detection code (EDC) or an error correction code (ECC) applied to the data to be encrypted); and
  an instruction to encrypt the data to be encrypted and optionally to store the encrypted data in the processor-external memory 110; the encrypt instruction 418 may include one or more of the following encrypt instruction parameters:
  a memory address including a memory sector address (i) (Sector Address (i)), indicating a memory sector of the processor-external memory 110 (in general a data memory) and a memory block address (j) indicating a memory block within the indicated memory sector of the processor-external memory 110 (in general a data memory) in which the encrypted data or encrypted and authenticated data is to be stored, optionally in addition data redundancy (e.g. an error detection code (EDC) or an error correction code (ECC) applied to the memory address or the memory sector address);
  a memory tag identifier (Tag_ID) identifying a memory tag associated with a portion of the processor-external memory 110 (in general a data memory) in which the encrypted data or encrypted and authenticated data is to be stored;
  a master identifier (M_ID) identifying a master device which includes the one or more processors and which generated the instruction;
  a virtual machine (VM_ID) identifying a virtual machine of the master device identified by the master identifier, wherein the virtual machine implements the device requesting the cryptographic service of encrypting the data.

Upon receipt of the ASIL-D data set 624, the mode selector 622 selects one of the operation modes as outlined above which should be used to process the ASIL-D data set 624.

Illustratively, the mode selector 622 may be configured to validate that the data which is received at the boundary of the multi-mode data cryptographic device 612, e.g. at the interface 106, are correct and will be processed in accordance with a selected operation mode. If the incoming data is accompanied with an associated EDC code (or ECC code), the mode selector 622 may recalculate the EDC code (or ECC code) on the received data and check the recalculated ECC code (or EDC code) against the received EDC code.

The mode selector 622 may be configured to perform the selection to be dynamic e.g. depends upon the incoming memory (sector) address and control information (M_ID, Tag_ID or VM_ID).

As an alternative, the mode selector 622 may be configured to perform the selection to be static e.g. one time only and does not depend upon dynamic behavior of incoming transaction Furthermore, the mode selector 622 may be configured to select a mode depending upon the type of application in which MCU 600 is used.

Safe and Secure Memory Data Write Mode 614

Figure 7:
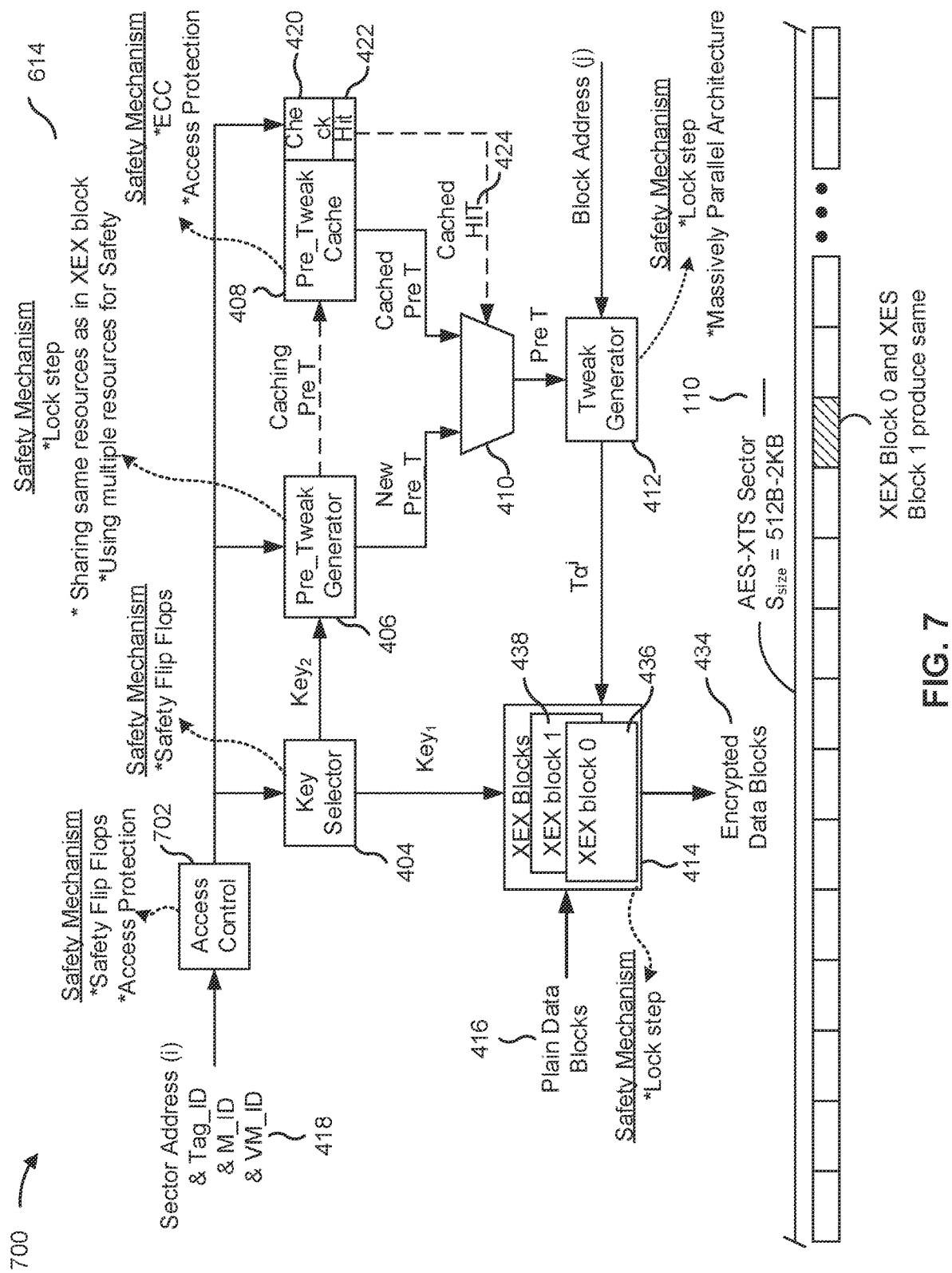
FIG. 7 shows an implementation of a safe and secure memory data write mode in accordance with various implementations.

FIG. 7 shows an implementation of the safe and secure memory data write mode 614 in accordance with various implementations in more detail. The implementation of the safe and secure memory data write mode 614 is based on the data cryptographic device 400 as shown in FIG. 4. Therefore, only the additional amendments in this implementation will be described in more detail. With respect to the other components, reference is made to the data cryptographic device 400 as shown in FIG. 4.

The implementation of the safe and secure memory data write mode 614 may further include an access control circuit 702 performing an access control when receiving the encrypt instruction 418 to provide access protection. The access control circuit 702 may include one or more safety flip-flops.

In this implementation, each single data block is individually handled with safe computation. Redundant blocks may be used for lock step computation.

The individual components of the data cryptographic device 400 as shown in FIG. 4 may be amended as follows to provide the safe and secure memory data write mode 614:

- The key selector 404 may further include one or more safety flip-flops.
- The pre-tweak generator 406 may provide a lock step mechanism. Moreover, various resources may be shared between the pre-tweak generator 406 and the XEX block of the AES-XTS circuit 414.
- The pre-tweak cache 408 may be configured to provide an access protection mechanism as well as an error detection (using e.g. an error dection code (EDC)) and optionally in addition an error correction (using e.g. an error correction code (ECC)).
- The tweak generator 412 may also provide a lock step mechanism. Moreover, the tweak generator 412 may have a (massive) parallel architecture.
- The AES-XTS circuit 414 may also provide a lock step mechanism.

Secure Memory Data Write Mode 616

The secure memory data write mode 616 may only provide one or more security mechanisms such as encryption and/or decryption of data, e.g. this mode may not provide any safety mechanism like error detection or error correction of the data.

The secure memory data write mode 616 may be implemented e.g. by the data cryptographic device 400 as shown in FIG. 4. In this mode, the data cryptographic device 400 may encrypt multiple blocks simultaneously. This may be done by exploiting the principle of spatial locality. In this mode, neighboring data in the processor-external memory 110 may be requested in the respectively following transaction requested in a subsequent instruction, for example.

Safe Memory Data Write Mode 618

The safe memory data write mode 618 may only provide one or more safety mechanisms like error detection or error correction of the data, e.g. this mode may not provide any security mechanism such as encryption and/or decryption of data.

Bypass Memory Data Write Mode 620

The bypass memory data write mode 620 may neither provide any safety mechanism like error detection or error correction of the data nor any security mechanism such as encryption and/or decryption of data. In this mode, the input data are merely forwarded to the processor-external memory 110 or to another memory such as a DRAM without any changes.

The results of the data processing in accordance with any one of the above mentioned e.g. four modes will be supplied to a memory transaction generator 624. The memory transaction generator 624 may include a controller. The memory transaction generator 624 may be configured to control the writing (storing) the supplied results of the data processing into the processor-external memory 110. The memory transaction generator 624 may work based on an external memory specific protocol. Illustratively, the memory transaction generator 624 may be a DRAM controller to communicate data with external DRAM device or it can be Flash controller to communicate data with the processor-external Flash devices or any other memory controller to communicate data with the processor-external memory 110.

In various implementations, the processor-external memory 110 may include various memory regions in its address space. A memory region of the plurality of memory regions may be assigned to a specifically required operation mode of a write operation, e.g. to one or more operation modes as admissible operation modes.

By way of example, a first memory region 626 may require the safe and secure memory data write mode 614 in case data are to be stored in the first memory region 626. In other words, in case the multi-mode data cryptographic device 612 wants to store data into the first memory region 626 of the processor-external memory 110 and operates in any operation mode different from the safe and secure memory data write mode 614, the write access request will be rejected. Illustratively, data stored in the first memory region 626 may have a requirement for security as well as safety. Thus, encrypted data may be written along with information redundancy to achieve a desired high ASIL level on encrypted data on QM memory elements.

Furthermore, a second memory region 628 may require the secure memory data write mode 616 in case data are to be stored in the second memory region 628. In other words, in case the multi-mode data cryptographic device 612 wants to store data into the second memory region 628 of the processor-external memory 110 and operates in any operation mode different from the secure memory data write mode 616, the write access request will be rejected. By way of example, data stored in the second memory region 628 may have a requirement for security only. That means neither the safe computation may be required nor the additional information redundancy may be required, which is required for safety. In various implementations, the same resources may be shared for safe mode in a performance mode to perform parallel execution.

Moreover, a third memory region 630 may require the bypass memory data write mode 620 in case data are to be stored in the third memory region 630. In other words, in case the data cryptographic device wants to store data into the third memory region 630 of the processor-external memory 110 and operates in any operation mode different from the bypass memory data write mode 620, the write access request will be rejected. By way of example, data stored in the third memory region 630 may have no requirement for safety or security.

Finally, a fourth memory region 632 may require the safe memory data write mode 618 in case data are to be stored in the fourth memory region 632. In other words, in case the multi-mode data cryptographic device 612 wants to store data into the fourth memory region 632 of the processor-external memory 110 and operates in any operation mode different from the safe memory data write mode 618, the write access request will be rejected. By way of example, data stored in the fourth memory region 632 may have a requirement for safety only. That means it may only be required to include the information redundancy information along with the data to achieve a desired high ASIL-Level.

It is to be noted that various implementations may provide multiple ASIL levels on secure data as desired.

Furthermore, by way of example, a data cryptographic device may be configured to provide a safe and secure memory data read function.

Figure 8:
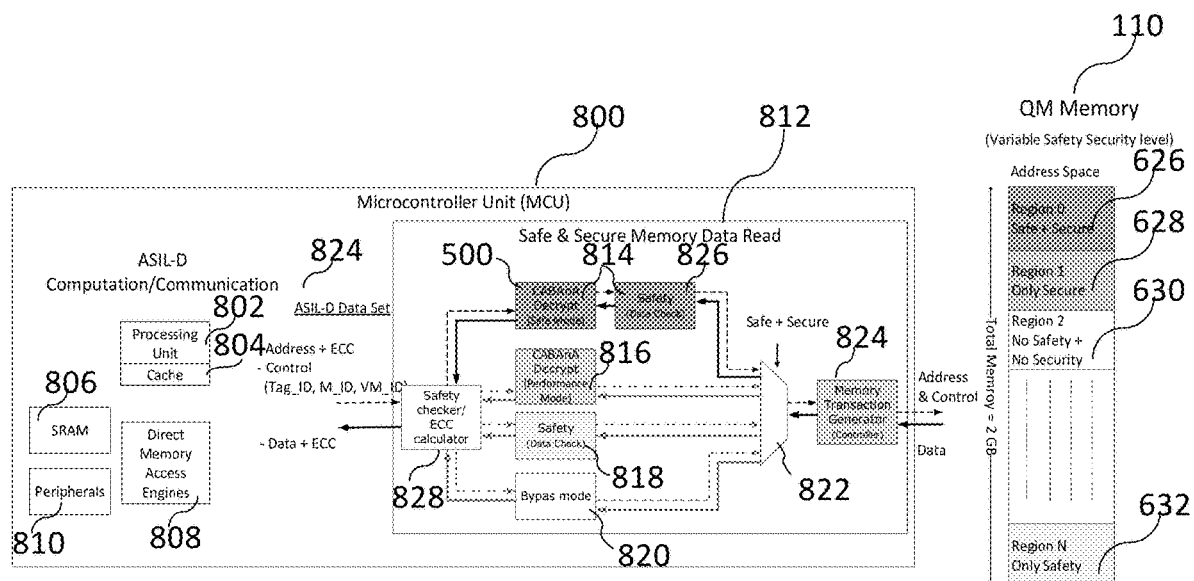
FIG. 8 shows a microcontroller unit in accordance with various implementations.

FIG. 8 shows a microcontroller unit (MCU) 800 in accordance with various implementations providing a ASIL level D. The MCU 800 may include various computation and/or communication components such as one or more processing units 802 with associated one or more cache memories 804, a volatile memory 806 such as SRAM (Static Random Access Memory), one or more direct memory access (DMA) engines 808, and optionally one or more additional peripheral devices 810.

The MCU 800 may further implement a multi-mode data cryptographic device 812. The multi-mode data cryptographic device 812 may implement one or more of the following operation modes, which will be explained in more detail further below:

safe and secure memory data read mode 814; and/or
secure memory data read mode 816; and/or
safe memory data read mode 818; and/or
bypass memory data read mode 820.

The MCU 800 may further include a mode selector 822 configured to select an operation mode offered by the multi-mode data cryptographic device 812, e.g. an operation mode as outlined above. The mode selector 822 may be configured to select an operation mode based on a mode selection signal which may be provided by a user or which may be part of an input instruction 824 which may be received (e.g. via the interface 106) by the multi-mode data cryptographic device 812, and which may include an ASIL-D data set 624. The ASIL-D data set 824 may include:

- a decrypt instruction to decrypt encrypted data to be decrypted and optionally to read the encrypted data stored in the processor-external memory 110; the decrypt instruction may include one or more of the following decrypt instruction parameters:
- a memory address including a memory sector address (i) (Sector Address (i)), indicating a memory sector of the processor-external memory 110 (in general a data memory) and a memory block address (j) indicating a memory block within the indicated memory sector of the processor-external memory 110 (in general a data memory) in which the encrypted data or encrypted and authenticated data is stored, optionally in addition data redundancy (e.g. an error detection code (EDC) or an error correction code (ECC) applied to the memory address or the memory sector address);
- a memory tag identifier (Tag_ID) identifying a memory tag associated with a portion of the processor-external memory 110 (in general a data memory) in which the encrypted data or encrypted and authenticated data is stored;
- a master identifier (M_ID) identifying a master device which includes the one or more processors and which generated the instruction;
- a virtual machine (VM_ID) identifying a virtual machine of the master device identified by the master identifier, wherein the virtual machine implements the device requesting the cryptographic service of encrypting the data.

Upon receipt of the ASIL-D data set 824, the mode selector 822 selects one of the operation modes as outlined above which should be used to process the data read from the processor-external memory 110.

Furthermore, a safety checker circuit 828 may be provided configured to check e.g. optional memory address redundancy associated with the memory address or the memory sector address, e.g. using an error detection code or an error correction code calculated for the memory address or the memory sector address and added thereto. Furthermore, the safety checker circuit 828 may be configured to provide error detection and optionally also error correction for the data read from the processor-external memory 110.

Safe and Secure Memory Data Read Mode 814

The implementation of the safe and secure memory data read mode 814 may be implemented by the data cryptographic device 500 as shown in FIG. 5. Furthermore, a safety check circuit 826 may be provided. The safety circuit 826 may be configured to check if the read data include redundancy to allow an error detection or an error correction for the encrypted data stored in the processor-external memory 110.

Secure Memory Data Read Mode 816

The secure memory data read mode 816 may only provide one or more security mechanisms such as encryption and/or decryption of data, e.g. this mode may not provide any safety mechanism like error detection or error correction of the data.

The secure memory data read mode 816 may be implemented e.g. by the data cryptographic device 500 as shown in FIG. 5. In this mode, the data cryptographic device 500 may decrypt multiple blocks simultaneously. This may be done by exploiting the principle of spatial locality. In this mode, neighboring data in the processor-external memory 110 may be requested in the respectively following transaction requested in a subsequent instruction, for example.

Safe Memory Data Read Mode 818

The safe memory data read mode 818 may only provide one or more safety mechanisms like error detection or error correction of the data, e.g. this mode may not provide any security mechanism such as encryption and/or decryption of data.

Bypass Memory Data Read Mode 820

The bypass memory data read mode 820 may neither provide any safety mechanism like error detection or error correction of the data nor any security mechanism such as encryption and/or decryption of data. In this mode, the input data are merely forwarded to the requesting device, e.g. to the interface 106, without any changes.

The data is read from the processor-external memory 110 by a memory transaction generator 824 in response to the read instruction 518. The memory transaction generator 824 supplies the read data to the mode selector 822, which will supply the same to the data cryptographic device in accordance with the selected operation mode. The memory transaction generator 824 may include a controller. The memory transaction generator 824 may be configured to control the reading of the requested data from the processor-external memory 110. The memory transaction generator 824 may work based on an external memory specific protocol.

As already described above, the processor-external memory 110 may include various memory regions in its address space. A memory region of the plurality of memory regions may be assigned to a specifically required operation mode of a read operation, e.g. to one or more operation modes as admissible operation modes.

By way of example, the first memory region 626 may require the safe and secure memory data read mode 814 in case data is stored in the first memory region 626. In other words, in case the data cryptographic device wants to read data from the first memory region 626 of the processor-external memory 110 and operates in any operation mode different from the safe and secure memory data read mode 814, the read access request will be rejected.

Furthermore, a second memory region 628 may require the secure memory data read mode 816 in case data is stored in the second memory region 628. In other words, in case the data cryptographic device wants to read data from the second memory region 628 of the processor-external memory 110 and operates in any operation mode different from the secure memory data read mode 816, the read access request will be rejected.

Moreover, a third memory region 630 may require the bypass memory data read mode 820 in case data is stored in the third memory region 630. In other words, in case the data cryptographic device wants to read data stored in the third memory region 630 of the processor-external memory 110 and operates in any operation mode different from the bypass memory data read mode 820, the read access request will be rejected.

Finally, a fourth memory region 632 may require the safe memory data read mode 818 in case data is stored in the fourth memory region 632. In other words, in case the data cryptographic device wants to store data into the fourth memory region 632 of the processor-external memory 110 and operates in any operation mode different from the safe memory data read mode 818, the read access request will be rejected.

Furthermore, by way of example, a data cryptographic device may be configured to provide a safe and secure memory data read function.

It is to be noted that the MCU 600 and the MCU 800 may be combined within one common package or e.g. within the a common chip.

In various aspects of this disclosure, various components of the MCU (data write device) 600 as shown in FIG. 6 and components of the MCU (data read device) 800 as shown in FIG. 8 may be merged. In this implementation even when merging most components, separate XEX blocks 436, 438 and XDX blocks 536, 538 should be provided. The selection of the XEX blocks 436, 438 or the XDX blocks 536, 538 may be based on the control signal whether the received instruction 418, 518 represents a read transaction or write transaction.

Figure 9:
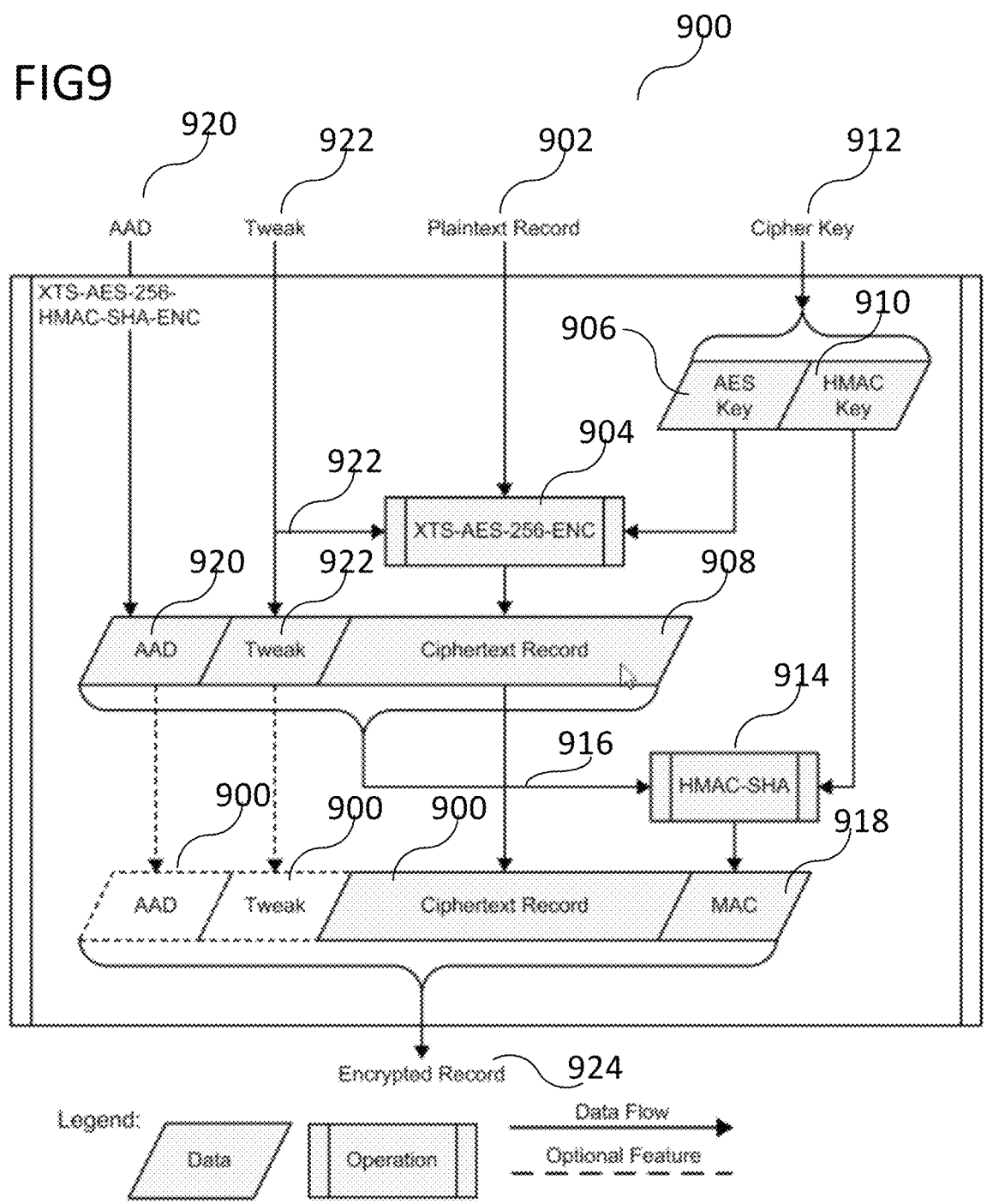
FIG. 9 shows a block diagram illustrating an implementation with additional authentication in accordance with various implementations.

FIG. 9 shows a block diagram 900 illustrating an implementation with additional authentication in accordance with various implementations.

In various aspects of this disclosure, the data cryptographic device or e.g. the memory system may provide an authentication mechanism in addition to the encryption/decryption mechanisms.

As shown in FIG. 9, plaintext data to be encrypted (also referred to as plaintext record) 902 is encrypted, e.g. using AES XTS encryption (in block 904) using e.g. AES keys 906 of a desired length, e.g. having 256 bit, to generate encrypted data (also referred to as ciphertext record) 908. Each AES key 906 may have an assigned Keyed-Hash Message Authentication Code (HMAC) key 910. Each pair of an AES key 906 and its assigned HMAC key 910 may form a cipher key 912. The cipher keys 912 may be stored in the key memory 402. An HMAC-SHA algorithm (or any other MAC or HMAC algorithm) 914 may be applied to input data 916 using the HMAC key 910 being assigned to the AES key 906 used for the encryption of the data to be encrypted 902, thereby generating a Message Authentication Code (MAC) 918. The input data 916 may include or essentially consist of the encrypted data 908, additional associated data (AAD) 920, and the tweak value 922 (which is also used for the encryption process). Finally, an encrypted record 924 is formed and may be stored in the processor-external memory 110. The encrypted record 924 may include or essentially consist of the encrypted data 908, the AAD 920, the tweak value 922, and the MAC 918.

The verification of an encrypted record 924 e.g. stored in the processor-external memory 110 may work in an analogue manner.

Figure 10:
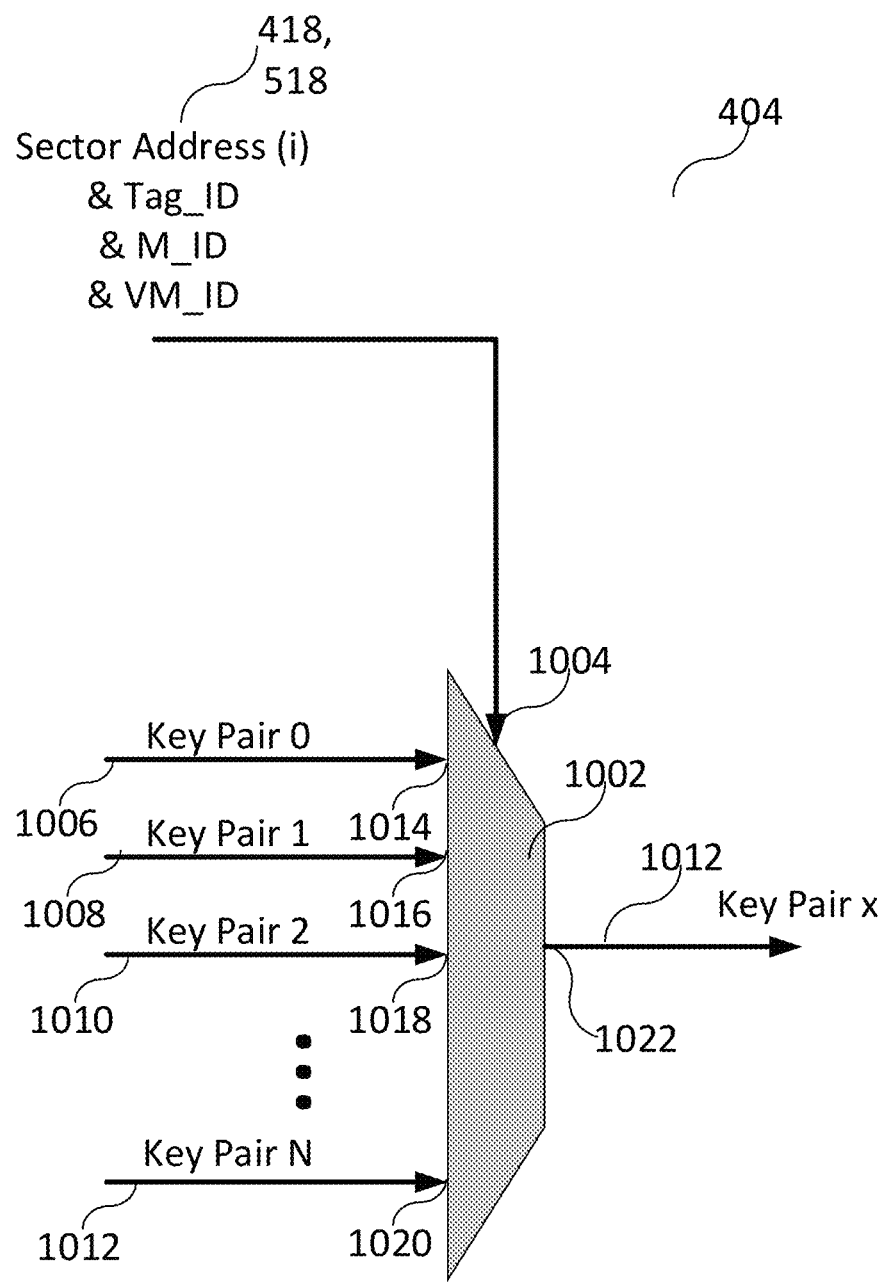
FIG. 10 shows an implementation of the key selector in accordance with various implementations.

FIG. 10 shows an implementation of the key selector 404 in accordance with various implementations.

In this example implementation, it is assumed that a plurality of AES XTS key pairs 1006, 1008, 1010, 1012 are stored in the key memory 402. Each AES XTS key pair 1006, 1008, 1010, 1012 may include a first AES key $Key_1$ and a corresponding second AES key $Key_2$. The key selector 404 may include a multiplexer 1002 including a plurality of key inputs 1014, 1016, 1018, 1020 (in general, any number of key inputs may be provided), a control input 1004, and an output 1022. Each AES XTS key pair 1006, 1008, 1010, 1012 may be applied to a corresponding key input of the plurality of key inputs 1014, 1016, 1018, 1020. The parameters included in the write instruction 418 or the read instruction 518 may be provided to the control input 1004 of the multiplexer 1002 to select the correct AES XTS key pair 1006, 1008, 1010, 1012 associated with the memory sector address (i), for example. Illustratively, the key selector 404 may use the memory sector address along with other control information (tag_ID, master_ID, VM_ID) to select the key pair (e.g. the AES XTS key pair 1006, 1008, 1010, 1012) used for the current memory sector. It is to be noted that the key length of the various keys (e.g. a first AES XTS key pair 1006 may have a key length of 128 bit and a second AES XTS key pair 1008 may have a key length of 192 bit). The selected AES XTS key pair 1012 is provided at the output 1022 of the multiplexer 1002.

Figure 11:
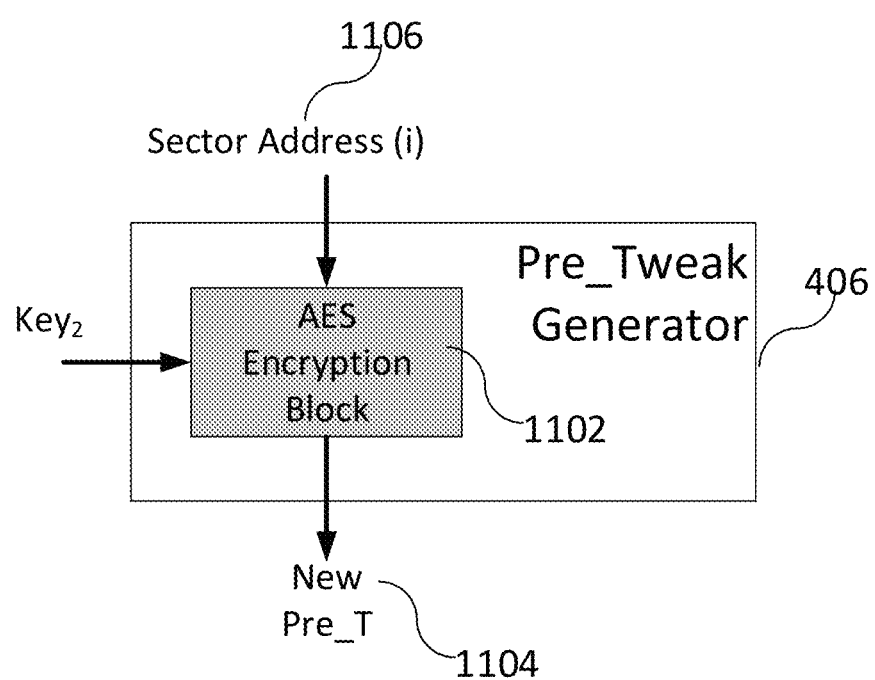
FIG. 11 shows an implementation of the pre-tweak generator in accordance with various implementations.

FIG. 11 shows an implementation of the pre-tweak generator 406 in accordance with various implementations.

The pre-tweak generator 406 may include one or more encryption blocks, e.g. AES encryption blocks 1102, which generates a new pre-tweak value New Pre_T 1104 by encrypting e.g. an applied input memory sector address (i) 1106 using e.g. the second AES key $Key_2$ of the selected AES XTS key pair 1012 provided at the output 1022 of the multiplexer 1002 in accordance with the AES algorithm in XTS mode.

Figure 12A:
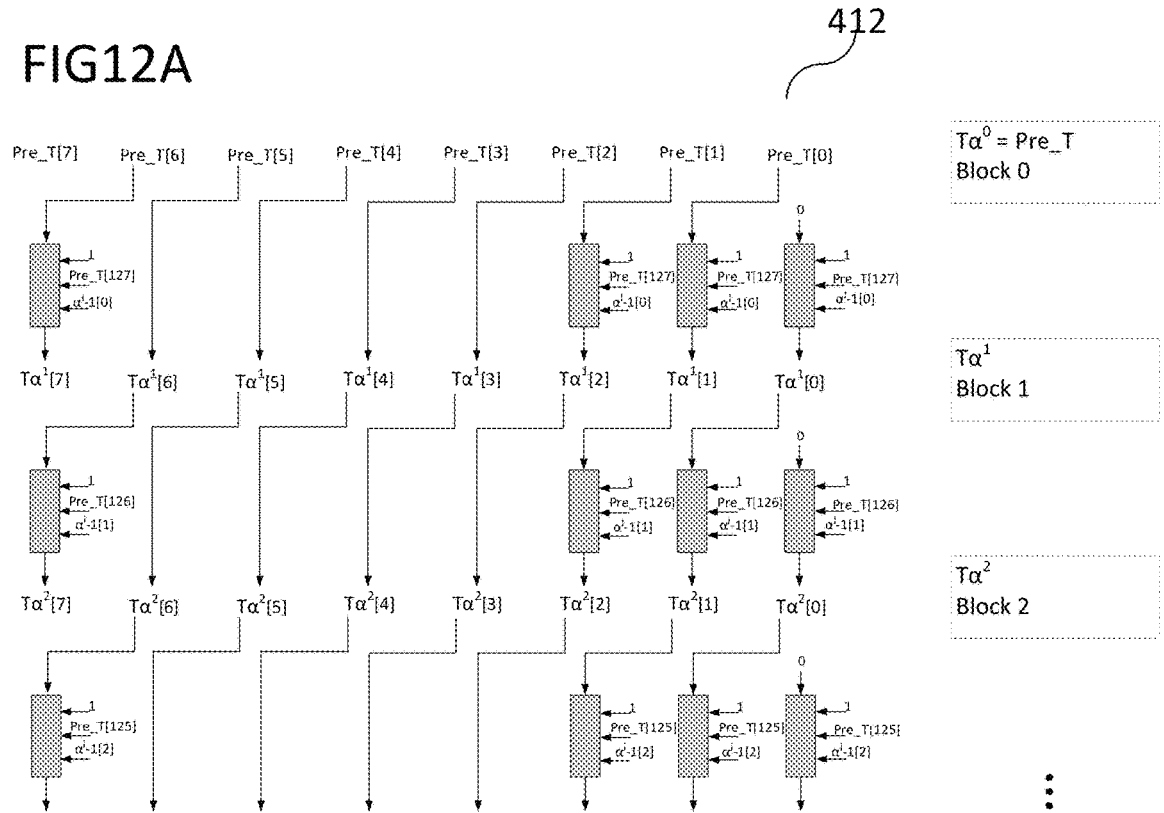
FIG. 12A and FIG. 12B show an implementation of the tweak generator in accordance with various implementations.
Figure 12B:
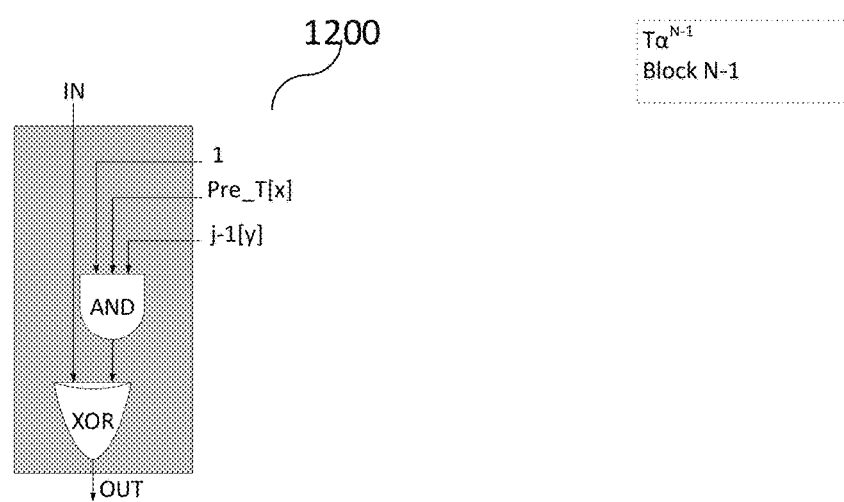

FIG. 12A and FIG. 12B show an implementation of the tweak generator 412 in accordance with various implementations.

This implementation uses pure combinational logic as shown in FIG. 12A implementing the following function and value:

Function 1: $T\alpha^j=Pre\_T*\alpha^j$, where $GF(2^{128})$ multiplication is required; and Value 1: $T\alpha^j$, where j=0, 1, . . . , N−1, calculated simultaneously.

FIG. 12B shows a logic block 1200 implementing above function 1.

It is to be noted that the total blocks (which are pure combinational logic) required for generating any tweak value is (N−1)*4 logic blocks 1200.

The total number of combinational logic blocks can be reduced with the introduction of sequential logic; and a limited number of $T\alpha_j$ can be calculated simultaneously.

Figure 13:
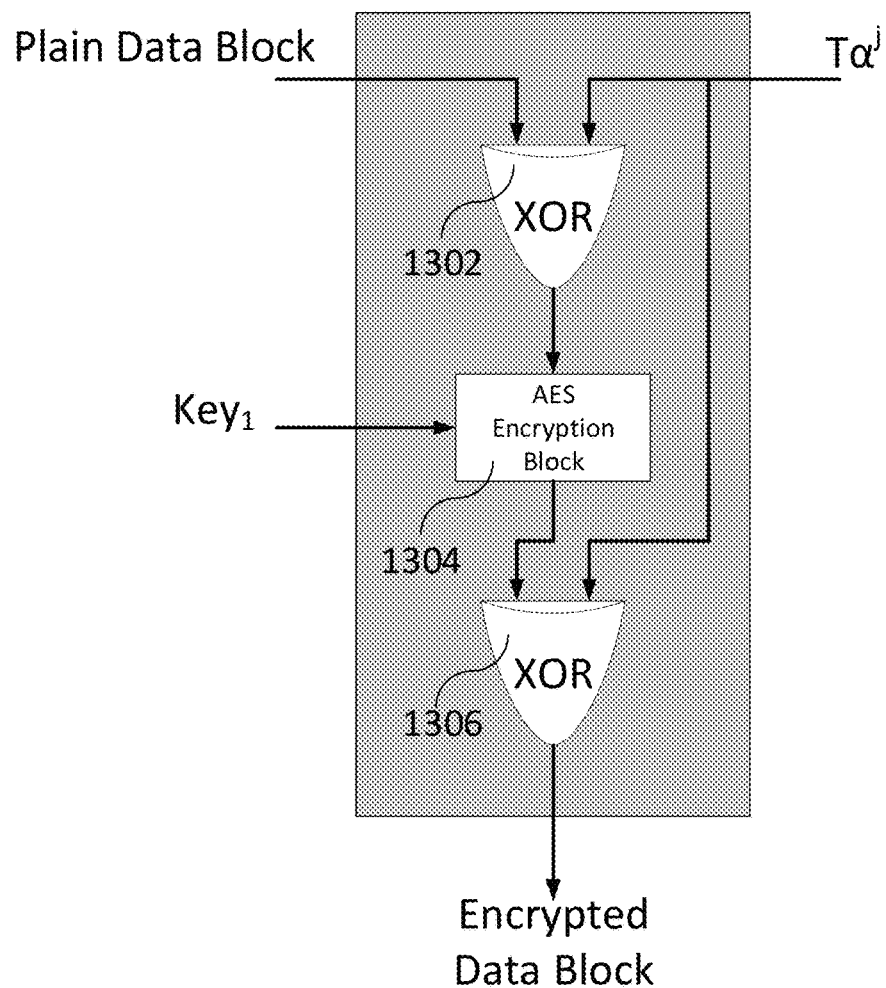
FIG. 13 shows an implementation of an XEX block (used in AES XTS encryption algorithm) in accordance with various implementations.

In various implementations, an irreducible Polynomial may be used for $GF(2^{128})$ multiplication=$x^{128}+x^7+x^2+x^1+1$ and a may be taken as α=x FIG. 13 shows an implementation of an XEX block (used in AES XTS encryption algorithm) 436, 438 in accordance with various implementations.

Each XEX block 436, 438 may include a first XOR gate 1302, an AES encryption block 1304, and a second XOR gate 1306. The first XOR gate 1302 receives a plain data block (in other words a block of data to be encrypted) at its first input and a tweak value $Tα^j$ at its second input. The XOR combination of these two values are provided at the output of the first XOR gate 1302 which supplies the same to a data input of the AES encryption block 1304. The AES encryption block 1304 encrypts the supplied XOR combination using e.g. the first AES key $Key_1$ to generate an intermediate data block and supplies the same to a first input of the second XOR gate 1306. The second XOR gate 1306 further receives the tweak value $Tα^j$ at its second input. The XOR combination of these two values is provided at the output of the second XOR gate 1306 as a respectively encrypted data block.

Figure 14:
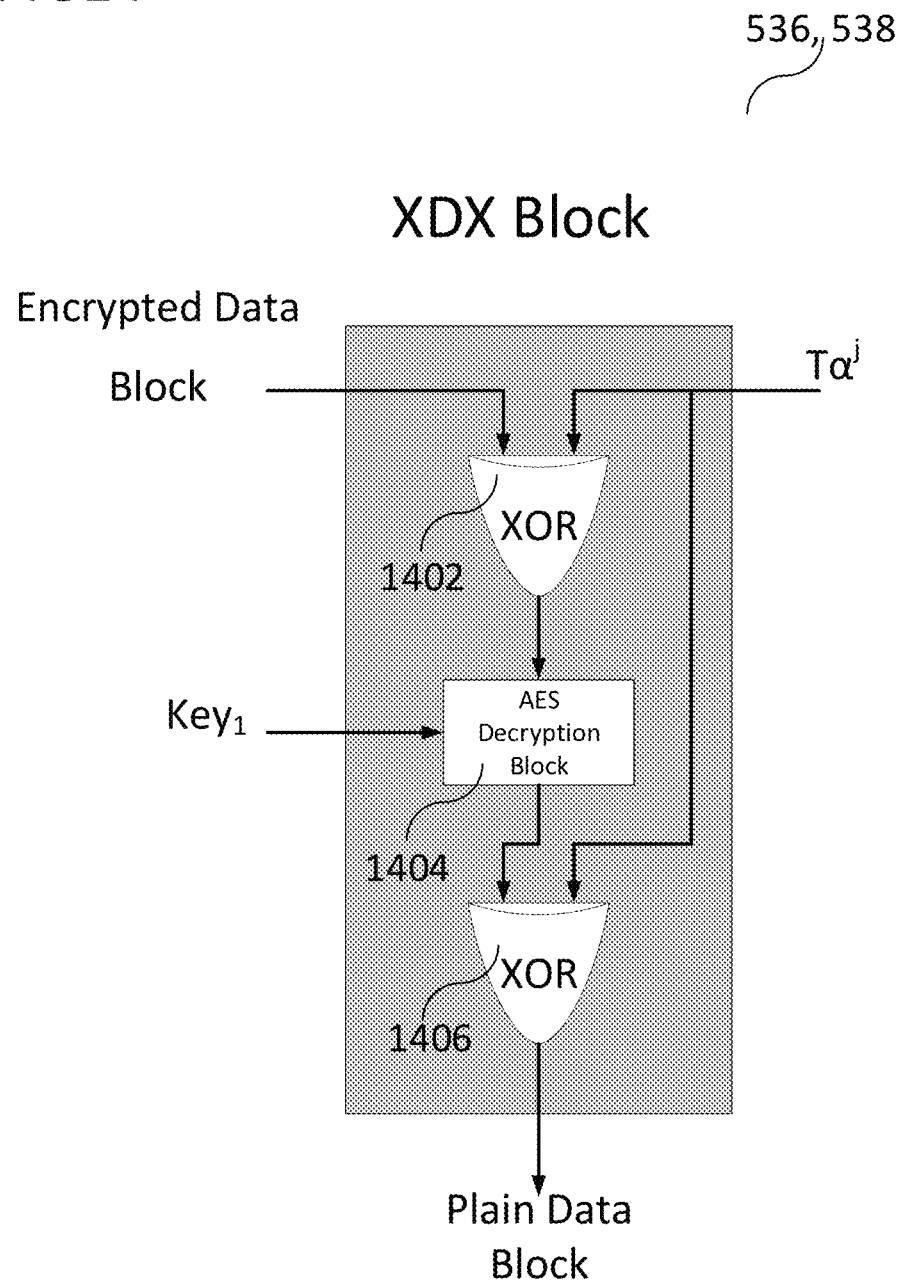
FIG. 14 shows an implementation of an XDX block (used in AES XTS decryption algorithm) in accordance with various implementations.

FIG. 14 shows an implementation of an XDX block (used in AES XTS decryption algorithm) 536, 538 in accordance with various implementations.

Each XDX block 536, 538 may include a third XOR gate 1402, an AES decryption block 1404, and a fourth XOR gate 1406. The third XOR gate 1402 receives an encrypted data block (in other words a block of encrypted data to be decrypted) at its first input and a tweak value $Tα^j$ at its second input. The XOR combination of these two values are provided at the output of the third XOR gate 1402 which supplies the same to a data input of the AES decryption block 1404. The AES decryption block 1404 decrypts the supplied XOR combination using e.g. the first AES key $Key_1$ to generate a further intermediate data block and supplies the same to a first input of the fourth XOR gate 1406. The fourth XOR gate 1406 further receives the tweak value $Tα^j$ at its second input. The XOR combination of these two values is provided at the output of the fourth XOR gate 1406 as a respectively decrypted data block.

FIG. 15 shows a method 1500 of operating a data cryptographic device in accordance with various implementations.

The method 1500 may include, in 1502, the start of the method, in 1504, checking whether a pre-tweak value for an input memory sector address is stored in a pre-tweak value cache memory, in 1506, in case the pre-tweak value for the input memory sector address is stored in the pre-tweak value cache memory ("Yes" in 1504), reading the pre-tweak value from the pre-tweak value cache memory and select the same as the pre-tweak value, and in 1508, in case the pre-tweak value for the input memory sector address is not stored in the pre-tweak value cache memory ("No" in 1504) to select a newly generated pre-tweak value. The method 1500 may further include, in 1510, generating a tweak value based on the selected pre-tweak value, and, in 1512, performing at least one block cipher algorithm to encrypt data, encrypt and authenticate data, decrypt encrypted data, decrypt and verify encrypted and authenticated data, using a cryptographic key and the generated tweak value.

FIG. 16 shows a method 1600 of operating a data cryptographic device in accordance with various implementations The method 1600 may include, in 1602, the start of the method, in 1604, generating a pre-tweak value, in 1606, generating a tweak value based on the pre-tweak value and based on a block address indicating a block of a sector of the data memory in which encrypted data or encrypted and authenticated data is to be stored or is stored, and, in 1608, performing at least one block cipher algorithm to encrypt data, encrypt and authenticate data, decrypt encrypted data, decrypt and verify encrypted and authenticated data, using a cryptographic key and the generated tweak value.

In the following, various aspects of this disclosure will be illustrated:

Example 1 is a data cryptographic device. The data cryptographic device may include a pre-tweak generator configured to generate pre-tweak values, a pre-tweak value cache memory configured to store one or more pre-tweak values generated by the pre-tweak generator, a pre-tweak value selector configured to check whether a pre-tweak value for an input memory address is stored in the pre-tweak value cache memory, the input memory address indicating an address of a data memory in which encrypted data or encrypted and authenticated data is to be stored or is stored, in case the pre-tweak value for the input memory address is stored in the pre-tweak value cache memory, reading the pre-tweak value from the pre-tweak value cache memory, in case the pre-tweak value for the input memory address is not stored in the pre-tweak value cache memory to select the pre-tweak value generated by the pre-tweak generator. The data cryptographic device may further include a tweak generator configured to generate a tweak value based on the selected pre-tweak value, and a block cipher configured to perform at least one block cipher algorithm to at least one of encrypt data, encrypt and authenticate data, decrypt encrypted data, decrypt and verify encrypted and authenticated data, using a cryptographic key and the generated tweak value.

In Example 2, the subject matter of Example 1 can optionally include that the pre-tweak generator is further configured to generate a pre-tweak value based on a memory sector address indicating a sector of a data memory in which encrypted data or encrypted and authenticated data is to be or is stored.

In Example 3, the subject matter of any one of Examples 1 or 2 can optionally include that the pre-tweak generator is further configured to generate a pre-tweak value based on a memory tag identifier identifying a memory tag associated with a portion of a data memory.

In Example 4, the subject matter of any one of Examples 1 to 3 can optionally include that the pre-tweak generator is further configured to generate a pre-tweak value based on a virtual machine identifier identifying a virtual machine providing the block cipher.

In Example 5, the subject matter of any one of Examples 1 to 4 can optionally include that the data cryptographic device further includes a key memory configured to store one or more cryptographic keys.

In Example 6, the subject matter of any one of Examples 1 to 5 can optionally include that the pre-tweak generator is further configured to generate a pre-tweak value using a cryptographic pre-tweak key.

In Example 7, the subject matter of any one of Examples 1 to 6 can optionally include that the tweak generator is further configured to generate a tweak value based on a block address indicating a block of a sector of the data memory in which encrypted data or encrypted and authenticated data is to be stored or is stored.

In Example 8, the subject matter of any one of Examples 1 to 7 can optionally include that the block cipher is configured to perform at least one block cipher algorithm in accordance with a tweaked codebook mode with ciphertext stealing algorithm.

In Example 9, the subject matter of any one of Examples 1 to 8 can optionally include that the block cipher is further configured to perform at least authentication algorithm to authenticate the data.

In Example 10, the subject matter of any one of Examples 1 to 9 can optionally include that the block cipher is configured to perform at least one block cipher algorithm selected from a group of block cipher algorithms consisting of: Advanced Encryption Standard, Data Encryption Standard, International Data Encryption Algorithm, RC5, and Blowfish.

In Example 11, the subject matter of any one of Examples 1 to 10 can optionally include that the data cryptographic device further includes an error detection circuit configured to detect an error in the encrypted data or encrypted and authenticated data stored in a data memory using an error detection code associated with the encrypted data or encrypted and authenticated data.

In Example 12, the subject matter of Example 11 can optionally include that the error detection circuit is further configured to correct an error in the encrypted data or encrypted and authenticated data stored in the data memory using an error correction code associated with the encrypted data or encrypted and authenticated data.

In Example 13, the subject matter of any one of Examples 11 or 12 can optionally include that the data cryptographic device further includes a mode selector configured to select at least one operation mode selected from a group consisting of: a security mode operating the block cipher to perform at least one block cipher algorithm, and/or a safety mode operating the error detection circuit to detect an error in the encrypted data or encrypted and authenticated data.

In Example 14, the subject matter of any one of Examples 1 to 13 can optionally include that the input memory address includes an input memory sector address of the data memory.

Example 15 is a data cryptographic device. The data cryptographic device may include a pre-tweak generator configured to generate pre-tweak values, a tweak generator configured to generate a tweak value based on the pre-tweak value and based on a block address indicating a block of a sector of the data memory in which encrypted data or encrypted and authenticated data is to be stored or is stored, and a block cipher configured to perform at least one block cipher algorithm to encrypt data, encrypt and authenticate data, decrypt encrypted data, decrypt and verify encrypted and authenticated data, using a cryptographic key and the generated tweak value.

In Example 16, the subject matter of Example 15 can optionally include that the pre-tweak generator is further configured to generate a pre-tweak value based on a memory sector address indicating a sector of a data memory in which encrypted data or encrypted and authenticated data is to be stored or is stored.

In Example 17, the subject matter of any one of Examples 15 or 16 can optionally include that the pre-tweak generator is further configured to generate a pre-tweak value based on a memory tag identifier identifying a memory tag associated with a portion of the data memory.

In Example 18, the subject matter of any one of Examples 15 to 17 can optionally include that the pre-tweak generator is further configured to generate a pre-tweak value based on a virtual machine identifier identifying a virtual machine providing the block cipher.

In Example 19, the subject matter of any one of Examples 15 to 18 can optionally include that the data cryptographic device further includes a key memory configured to store one or more cryptographic keys.

In Example 20, the subject matter of any one of Examples 15 to 19 can optionally include that the pre-tweak generator is further configured to generate a pre-tweak value using a cryptographic pre-tweak key.

In Example 21, the subject matter of any one of Examples 15 to 20 can optionally include that the block cipher is configured to perform at least one block cipher algorithm in accordance with a tweaked codebook mode with ciphertext stealing algorithm.

In Example 22, the subject matter of any one of Examples 15 to 21 can optionally include that the block cipher is further configured to perform at least authentication algorithm to authenticate the data or to verify the data.

In Example 23, the subject matter of any one of Examples 15 to 22 can optionally include that the block cipher is configured to perform at least one block cipher algorithm selected from a group of block cipher algorithms consisting of: Advanced Encryption Standard, Data Encryption Standard, International Data Encryption Algorithm, RC5, and Blowfish.

In Example 24, the subject matter of any one of Examples 15 to 23 can optionally include that the data cryptographic device further includes an error detection circuit configured to detect an error in the encrypted data or encrypted and authenticated data stored in a data memory using an error detection code associated with the encrypted data or encrypted and authenticated data.

In Example 25, the subject matter of Example 24 can optionally include that the error detection circuit is further configured to correct an error in the encrypted data or encrypted and authenticated data stored in the data memory using an error correction code associated with the encrypted data or encrypted and authenticated data.

In Example 26, the subject matter of any one of Examples 24 or 25 can optionally include that the data cryptographic device further includes a mode selector configured to select at least one operation mode selected from a group consisting of: a security mode operating the block cipher to perform at least one block cipher algorithm, and/or a safety mode operating the error detection circuit to detect an error in the encrypted data or encrypted and authenticated data.

Example 27 is a memory system. The memory system may include a data cryptographic device of any one of Examples 1 to 26, and a data memory configured to store the encrypted data or the encrypted and authenticated data.

Example 28 is a method of operating a data cryptographic device. The method may include checking whether a pre-tweak value for an input memory sector address is stored in a pre-tweak value cache memory, in case the pre-tweak value for the input memory sector address is stored in the pre-tweak value cache memory, reading the pre-tweak value from the pre-tweak value cache memory, in case the pre-tweak value for the input memory sector address is not stored in the pre-tweak value cache memory to select a newly generated pre-tweak value, generating a tweak value based on the selected pre-tweak value, and performing at least one block cipher algorithm to encrypt data, encrypt and authenticate data, decrypt encrypted data, decrypt and verify encrypted and authenticated data, using a cryptographic key and the generated tweak value.

In Example 29, the subject matter of Example 28 can optionally include that generating the pre-tweak value includes generating a pre-tweak value based on a memory sector address indicating a sector of a data memory in which encrypted data or encrypted and authenticated data is to be stored or is stored.

In Example 30, the subject matter of any one of Examples 28 or 29 can optionally include that generating the pre-tweak value includes generating a pre-tweak value based on a memory tag identifier identifying a memory tag associated with a portion of a data memory.

In Example 31, the subject matter of any one of Examples 28 to 30 can optionally include that generating the pre-tweak value includes generating a pre-tweak value based on a virtual machine identifier identifying a virtual machine implementing the block cipher.

In Example 32, the subject matter of any one of Examples 28 to 31 can optionally include that the method further includes a key memory storing one or more cryptographic keys.

In Example 33, the subject matter of any one of Examples 28 to 32 can optionally include that generating the pre-tweak value includes generating a pre-tweak value using a cryptographic pre-tweak key.

In Example 34, the subject matter of any one of Examples 28 to 33 can optionally include that generating the tweak value includes generating a tweak value based on a block address indicating a block of a sector of the data memory in which encrypted data or encrypted and authenticated data is to be stored or is stored.

In Example 35, the subject matter of any one of Examples 28 to 34 can optionally include that performing at least one block cipher algorithm includes performing at least one block cipher algorithm in accordance with a tweaked codebook mode with ciphertext stealing algorithm.

In Example 36, the subject matter of any one of Examples 28 to 35 can optionally include that performing at least one block cipher algorithm further includes performing at least authentication algorithm to authenticate the data or to verify the data.

In Example 37, the subject matter of any one of Examples 28 to 36 can optionally include that performing at least one block cipher algorithm includes performing at least one block cipher algorithm selected from a group of block cipher algorithms consisting of: Advanced Encryption Standard, Data Encryption Standard, International Data Encryption Algorithm, RC5, and Blowfish.

In Example 38, the subject matter of any one of Examples 28 to 37 can optionally include that the method further includes detecting an error in the encrypted data stored in a data memory using an error detection code associated with the encrypted data or the encrypted and authenticated data.

In Example 39, the subject matter of Example 38 can optionally include that the method further includes correcting an error in the encrypted data stored in the data memory using an error correction code associated with the encrypted data or encrypted and authenticated data.

In Example 40, the subject matter of any one of Examples 38 or 39 can optionally include that the method further includes selecting at least one operation mode selected from a group consisting of: performing at least one block cipher algorithm, and/or detecting an error in the encrypted data or the encrypted and authenticated data.

Example 41 is a method of operating a data cryptographic device. The method may include generating a pre-tweak value, generating a tweak value based on the pre-tweak value and based on a block address indicating a block of a sector of the data memory in which encrypted data or encrypted and authenticated data is to be stored or is stored, and performing at least one block cipher algorithm to encrypt data, encrypt and authenticate data, decrypt encrypted data, decrypt and verify encrypted and authenticated data, using a cryptographic key and the generated tweak value.

In Example 42, the subject matter of Example 41 can optionally include that generating a pre-tweak value includes generating a pre-tweak value based on a memory sector address indicating a sector of a data memory in which encrypted data or encrypted and authenticated data is to be stored or is stored.

In Example 43, the subject matter of any one of Examples 41 or 42 can optionally include that generating a pre-tweak value includes generating a pre-tweak value based on a memory tag identifier identifying a memory tag associated with a portion of the data memory.

In Example 44, the subject matter of any one of Examples 41 to 43 can optionally include that generating a pre-tweak value includes generating a pre-tweak value based on a virtual machine identifier identifying a virtual machine implementing the block cipher.

In Example 45, the subject matter of any one of Examples 41 to 44 can optionally include that the method further includes storing one or more cryptographic keys.

In Example 46, the subject matter of any one of Examples 41 to 45 can optionally include that generating a pre-tweak value includes generating a pre-tweak value using a cryptographic pre-tweak key.

In Example 47, the subject matter of any one of Examples 41 to 46 can optionally include that performing at least one block cipher algorithm includes performing at least one block cipher algorithm in accordance with a tweaked codebook mode with ciphertext stealing algorithm.

In Example 48, the subject matter of any one of Examples 41 to 47 can optionally include that performing at least one block cipher algorithm further includes performing at least authentication algorithm to authenticate the data or to verify the data.

In Example 49, the subject matter of any one of Examples 41 to 48 can optionally include that performing at least one block cipher algorithm includes performing at least one block cipher algorithm selected from a group of block cipher algorithms consisting of: Advanced Encryption Standard, Data Encryption Standard, International Data Encryption Algorithm, RC5, and Blowfish.

In Example 50, the subject matter of any one of Examples 41 to 49 can optionally include that the method further includes detecting an error in the encrypted data stored in a data memory using an error detection code associated with the encrypted data or the encrypted and authenticated data.

In Example 51, the subject matter of Example 50 can optionally include that the method further includes correcting an error in the encrypted data stored in the data memory using an error correction code associated with the encrypted data or the encrypted and authenticated data.

In Example 52, the subject matter of any one of Examples 50 or 51 can optionally include that the method further includes selecting at least one operation mode selected from a group consisting of: performing at least one block cipher algorithm; and/or detecting an error in the encrypted data or the encrypted and authenticated data.

Example 53 is a method of operating a memory system. The method may include performing a method of any one of Examples 28 to 52, and storing the encrypted data in a data memory or reading the encrypted data or the encrypted and authenticated data from the data memory.

While the implementation has been particularly shown and described with reference to specific implementations, it should be understood by those skilled in the art that various changes in form and detail may be made therein without departing from the spirit and scope of the implementation as defined by the appended claims. The scope of the implementation is thus indicated by the appended claims and all changes which come within the meaning and range of equivalency of the claims are therefore intended to be embraced.

What is claimed is:

1. A data cryptographic device, comprising:
a pre-tweak generator to generate a pre-tweak value based on an input memory address,
wherein the input memory address indicates an address of a data memory for storing encrypted data or encrypted and authenticated data, and
wherein the pre-tweak generator is further to generate the pre-tweak value using a cryptographic pre-tweak key;
a pre-tweak value cache memory to store the pre-tweak value generated by the pre-tweak generator;
a pre-tweak value selector to:
check whether a particular pre-tweak value for a particular input memory address is stored in the pre-tweak value cache memory;
selectively perform:
read, based on determining that the particular pre-tweak value for the particular input memory address is stored in the pre-tweak value cache memory, the particular pre-tweak value from the pre-tweak value cache memory as a selected pre-tweak value, or
select, based on determining that the particular pre-tweak value for the particular input memory address is not stored in the pre-tweak value cache memory, a generated pre-tweak value as the selected pre-tweak value;
a tweak generator to generate a tweak value based on the selected pre-tweak value; and
a block cipher to perform at least one block cipher algorithm, based on using a cryptographic key and the tweak value, to at least one of:
encrypt data,
encrypt and authenticate data,
decrypt the encrypted data, or
decrypt and verify the encrypted and authenticated data.

2. The data cryptographic device of claim 1,
wherein the tweak generator is further to generate the tweak value based on a block address indicating a block of a sector of the data memory in which the encrypted data or the encrypted and authenticated data is to be stored or is stored.

3. The data cryptographic device of claim 1,
wherein the block cipher is to perform at least one block cipher algorithm in accordance with a tweaked codebook mode with ciphertext stealing algorithm.

4. The data cryptographic device of claim 1,
wherein the block cipher is further to perform at least an authentication algorithm to authenticate the data.

5. The data cryptographic device of claim 1, further comprising:
an error detection circuit to detect an error in the encrypted data or the encrypted and authenticated data stored in another data memory using an error detection code associated with the encrypted data or the encrypted and authenticated data.

6. The data cryptographic device of claim 5, further comprising:
a mode selector to select at least one operation mode selected from a group consisting of:
a security mode operating the block cipher to perform at least one block cipher algorithm; and
a safety mode operating the error detection circuit to detect an error in the encrypted data or the encrypted and authenticated data.

7. The data cryptographic device of claim 1,
wherein the input memory address comprises an input memory sector address of the data memory.

8. A data cryptographic device, comprising:
a pre-tweak generator to generate a pre-tweak value based on a memory sector address,
wherein the memory sector address indicates a sector of a data memory for storing encrypted data or encrypted and authenticated data, and
wherein the pre-tweak generator is further to generate the pre-tweak value using a cryptographic pre-tweak key;
a tweak generator to generate a tweak value based on the pre-tweak value and based on a block address indicating a block of a sector of a data memory in which encrypted data or encrypted and authenticated data is to be stored or is stored; and
a block cipher to perform at least one block cipher algorithm, based on using a cryptographic key and the tweak value, to at least one of:
encrypt data,
encrypt and authenticate data,
decrypt the encrypted data, or
decrypt and verify the encrypted and authenticated data.

9. The data cryptographic device of claim 8,
wherein the block cipher is to perform at least one block cipher algorithm in accordance with a tweaked codebook mode with ciphertext stealing algorithm.

10. The data cryptographic device of claim 8,
wherein the block cipher is further to perform at least an authentication algorithm to authenticate the data or to verify the data.

11. The data cryptographic device of claim 8, further comprising:
an error detection circuit to detect an error in the encrypted data or the encrypted and authenticated data stored in the data memory using an error detection code associated with the encrypted data or the encrypted and authenticated data.

12. The data cryptographic device of claim 11, further comprising:
a mode selector to select at least one operation mode selected from a group consisting of:
a security mode operating the block cipher to perform at least one block cipher algorithm; and/or
a safety mode operating the error detection circuit to detect an error in the encrypted data or the encrypted and authenticated data.

13. A memory system, comprising:
a data cryptographic device of claim 1; and
a data memory to store the encrypted data or the encrypted and authenticated data.

14. A method of operating a data cryptographic device, the method comprising:
generating a pre-tweak value based on an input memory sector address, wherein the input memory sector address indicates an address of a data memory for storing encrypted data or encrypted and authenticated data, and wherein the generated pre-tweak value is generated using a cryptographic pre-tweak key;

checking whether a particular pre-tweak value for a particular input memory sector address is stored in a pre-tweak value cache memory;

reading, based on determining that the particular pre-tweak value for the particular input memory sector address is stored in the pre-tweak value cache memory, the particular pre-tweak value from the pre-tweak value cache memory as a selected pre-tweak value;

selecting, based on determining that the particular pre-tweak value for the particular input memory sector address is not stored in the pre-tweak value cache memory, a newly generated pre-tweak value as the selected pre-tweak value;

generating a tweak value based on the selected pre-tweak value; and performing at least one block cipher algorithm, based on using a cryptographic key and the generated tweak value, to at least one of:

encrypt data, encrypt and authenticate data, decrypt the encrypted data, or decrypt and verify the encrypted and authenticated data.

15. The method of claim 14, wherein the tweak value is generated based on a block address indicating a block of a sector of the data memory for storing the encrypted data or the encrypted and authenticated data.

16. The method of claim 14, further comprising:

detecting an error in the encrypted data or the encrypted and authenticated data stored in another data memory using an error detection code associated with the encrypted data or the encrypted and authenticated data.

17. A method of operating a data cryptographic device, the method comprising:

generating a pre-tweak value based on an input memory address, wherein the input memory address indicates an address of a data memory for storing encrypted data or encrypted and authenticated data, and wherein the generated pre-tweak value is generated using a cryptographic pre-tweak key;

generating a tweak value based on the pre-tweak value and based on a block address indicating a block of a sector of a data memory in which encrypted data or encrypted and authenticated data is to be stored or is stored; and performing at least one block cipher algorithm, based on using a cryptographic key and the generated tweak value, to at least one of:

encrypt data, encrypt and authenticate data, decrypt the encrypted data, or decrypt and verify the encrypted and authenticated data.

18. The method of claim 17, wherein the tweak value is generated based on a block address indicating a block of a sector of the data memory for storing the encrypted data or the encrypted and authenticated data.

19. The method of claim 17, further comprising:

detecting an error in the encrypted data or the encrypted and authenticated data stored in another data memory using an error detection code associated with the encrypted data or the encrypted and authenticated data.

20. A method of operating a memory system, the method comprising:

performing a method of claim 14; and storing the encrypted data or the encrypted and authenticated data in a data memory or reading the encrypted data or the encrypted and authenticated data from the data memory.

* * * * *